US005986259A

United States Patent [19]

Hirabayashi et al.

[11] Patent Number: 5,986,259

[45] Date of Patent: Nov. 16, 1999

[54] MASS SPECTROMETER

[75] Inventors: Yukiko Hirabayashi; Takayuki Nabeshima; Yasuaki Takada, all of Kokubunji; Minoru Sakairi, Tokorozawa; Hideaki Koizumi, Tokyo, all of Japan

[73] Assignee: Hitachi, Ltd., Tokyo, Japan

[21] Appl. No.: 08/837,216

[22] Filed: Apr. 22, 1997

[30] Foreign Application Priority Data

Apr. 23, 1996 [JP] Japan .................................... 8-100893

[51] Int. Cl.[6] ............................ B01D 59/44; H01J 49/00

[52] U.S. Cl. ............................................ 250/288; 250/281

[58] Field of Search .................................... 250/281, 288, 250/423 R

[56] References Cited

U.S. PATENT DOCUMENTS

| | | | |
|---|---|---|---|
| 4,708,782 | 11/1987 | Andersen et al. | 250/288 |
| 4,996,424 | 2/1991 | Mimura et al. | 250/288 |
| 5,103,093 | 4/1992 | Sakairi et al. | 250/288 |
| 5,171,990 | 12/1992 | Mylchreest et al. | 250/288 |
| 5,352,892 | 10/1994 | Mordehai et al. | 250/288 |
| 5,581,081 | 12/1996 | Kato et al. | 250/288 |
| 5,663,560 | 9/1997 | Sakairi et al. | 250/288 |
| 5,818,041 | 10/1998 | Mordehai et al. | 250/288 |
| 5,869,831 | 2/1999 | La Mora et al. | 250/288 |

FOREIGN PATENT DOCUMENTS

| | | |
|---|---|---|
| 61-194349 | 8/1986 | Japan . |
| 5-256837 | 10/1993 | Japan . |
| 7-159377 | 6/1995 | Japan . |
| 7-306193 | 11/1995 | Japan . |

OTHER PUBLICATIONS

Analytical Chemistry, vol. 59, 1987, pp. 2642–2646.

Journal of Physical Chemistry, vol. 88, 1984, pp. 4451–4459.

Analytical Chemistry, vol. 54, 1982, pp. 143–146.

Analytical Chemistry, vol. 66, 1994, pp. 4557–4559.

Analytical Chemistry, vol. 67, 1995, pp. 2878–2882.

*Primary Examiner*—Bruce C. Anderson

*Attorney, Agent, or Firm*—Fay, Sharpe, Beall, Fagan, Minnich & McKee

[57] ABSTRACT

In a mass spectrometer using a sonic spray ion source, a technique of controlling the density of droplets in a nebulized sample solution which is passed into a mass spectrometer at high vacuum to an appropriate value to thereby reduce analysis noises is disclosed. A sample solution in a sample solution injection unit 1 is introduced into a capillary 2 disposed in an ion source 6. A gas is introduced from a gas supply unit 4 by way of a gas pipe 5 into the ion source 6 and is caused to flow along the outer circumferential surface at the top end of the capillary 2 and is jetted out from the orifice 3 as a gas flow into atmospheric air. The sample solution jetted from the top end of the capillary 2 is ionized by the gas flow in the atmospheric air. Fine droplets or ions formed by the sonic spray method are collide against a diffuser 7, droplets and ions reduced for the density by the diffusion pass through the holes 8 disposed in the diffuser 7, and pass from the sample orifice 10 into a mass spectrometer 11 and mass analyzed. Provision of the diffuser 7 can suppress generation of analysis noises caused by the clustering phenomenon resulting from introduction of droplets or ions at high density into the mass spectrometer 11, thereby enabling to conduct analysis at high S/N ratio.

9 Claims, 18 Drawing Sheets

Position of Sampling Orifice 10

MASS SPECTROMETER

BACKGROUND OF THE INVENTION

The present invention relates to a mass spectrometer and an ion source used therefor and, in particular, it relates to an ion source constitution suitable to ionization of compounds present in solutions under an atmospheric pressure and introduction of resultant ions of the compounds into a mass spectrometer exhausted to a high vacuum, and a mass spectrometer using the ion source.

While compounds present in the solutions can be separated by a capillary electrophoresis system (CE) or a liquid chromatograph (LC), it is difficult to identify the composition of the separated compound. On the other hand, while the composition of the compounds can be identified at a high sensitivity by a mass spectrometer (MS), the compounds in the solution can not be separated. Thus, when a plurality of compounds dissolved in a solvent such as water are separated and analyzed, a capillary electrophoresis/mass spectrometer (CE/MS) comprising a combination of a mass spectrometer and a capillary electrophoresis system or a liquid chromatograph/mass spectrometer (LC/MS) comprising a combination of the mass spectrometer and a liquid chromatograph have been used generally. For analyzing the compound separated by the capillary electrophoresis system or the liquid chromatograph by the mass spectrometer, it is necessary to transform the compound molecules in the solution into gaseous ions. As a method of obtaining such gaseous ions, for example, an ion spray method (refer to Analytical Chemistry, vol. 59 (1987), pp. 2642–2646) has been known in the prior art. In the ion spray method, a specimen is introduced from one end of a fused-silica capillary (hereinafter referred to as a capillary) and nebulized from the other end (top end) into atmospheric pressure. A gas is supplied along the axial direction for the outer circumference of the capillary. A high voltage (3–6 kV) is applied between the capillary and a sampling orifice for passing the ions of the compounds in the solution into the mass spectrometer exhausted to a high vacuum, and a strong electric field is formed at the top end of the capillary. By the strong electric field, the specimen solution nebulized from the top end of the capillary is transformed into fine charged droplets by a so-called electrospraying phenomenon. Further, the ingredients of the solvent in the charged droplets are evaporated by a gas flow supplied along the outer circumference of the capillary to form gaseous ions of the compound. The formed ions of the compound are introduced by way of the sampling orifice into the mass spectrometer and mass spectralyzed. The gas flow promotes evaporation of the charged droplets, as well as suppresses the occurrence of electric discharge at the top end of the capillary.

Further, a method has also been proposed for ionizing compounds by setting the flow rate of the solution of the compounds supplied in the capillary to not more than 10 $\mu$l/min without supplying the gas flow to the outer circumference of the capillary (Journal of Physical Chemistry, vol. 88 (1984), pp. 4451–4459). Although the method is distinguished from the ion spray method described above, it is in common with that of the ion spray method regarding the principle of forming the ions. Further, an atmospheric pressure chemical ionization method (Analytical Chemistry, vol. 54 (1982), pp. 143–146) adopts a method of disposing an electrode near the top end of the capillary for generating electric discharge and ionizing droplets nebulized under an atmospheric pressure by the discharge.

In each of the spray ionizing methods described above, it is considered necessary to form fine charged droplets having a diameter of about not more than 10 nm in order to attain a high ion forming efficiency. U.S. Pat. No. 5,352,892 discloses a method of disposing a liquid shield before a mass spectrometer for allowing only a central portion of a spray in which a number of droplets of small particle diameter are gathered to pass for ionizing the ingredients of the specimen more efficiently by the ion spray method. Further, Japanese Patent Laid-Open Sho 61-194349 describes a method of disposing a sheet punctured at a center before a mass spectrometer to suppress spreading of the spray and to introduce only a portion of the spray with a small spreading angle into the mass spectrometer in order to attain efficient ionization by the atmospheric pressure chemical ionization method. Further, Japanese Patent Laid-Open Hei 07-159377 describes a method of disposing means for mixing sprays in order to promote the solvent evaporation effect for efficient ionization also in the atmospheric pressure chemical ionization method. Further, Japanese Patent Laid-Open Hei 5-256837 describes a method of heating the droplets formed by the nebulizing to promote evaporation.

Recently, an ionization method referred to as a sonic spray method has been reported which can efficiently form ions by merely nebulizing a sample solution with a gas at a sonic velocity (refer to Analytical Chemistry, vol. 66, (1994), pp. 4557–4559; Analytical Chemistry, vol. 67, (1995), pp. 2878–2882 and Japanese Patent Laid-Open Hei 07-306193). It is considered that fine charged droplets are formed by the flow of a gas at a sonic velocity and molecules of the solvent are evaporated to form ions in this method.

In the sonic spray method described above, a gas stream at a high speed is caused to flow in a close vicinity of a sampling orifice of a mass spectrometer. Accordingly, if the flow rate of the specimen solution is increased, a great amount of charged droplets are formed and passed from the orifice into the inside of the mass spectrometer, and charged droplets cooled by adiabatic expansion are clustered into large droplets to cause a problem of due in great noises which result. Accordingly, this method can not be used in a case where the flow rate of the specimen solution is as high as about 1 ml/min. Further, it also requires an operation for adjusting the gas flow rate in accordance with the flow rate of the specimen solution or the kind of the solvent, thereby inposing a large burden on users.

SUMMARY OF THE INVENTION

It is, accordingly, an object of the present invention to provide an ion source improved so as to further improve the ionizing efficiency of the sonic spray method described above and reduce noises, and a mass spectrometer using such an ion source.

Another object of the present invention is to provide a constitution of an ion source in which charged droplets passed into the mass spectrometer are not clustered into large droplets even if the flow rate of the specimen solution is high.

A further object of the present invention is to provide a mass spectrometer capable of moderating an adjusting operation that has to be conducted by users.

When the flow rate of the specimen solution is high, charged droplets are formed in large quantity in the spray nebulized from the ion source.

If the flow of the spray is passed into the mass spectrometer at high vacuum, since the pressure is lowered abruptly, adiabatic expansion is caused and they are cooled rapidly. If the density of the liquid droplets in the nebulized flow passed into the mass spectrometer is too high, the droplets are clustered by the cooling to form large droplets, so that noises are increased making the measurement difficult. In view of the above in the present invention, a diffuser is disposed between the ion source and sampling orifice (sampling hole) for spreading the nebulized flow and the nebulized flow is passed into the mass spectrometer once after lowering the density of the droplets thereby preventing the droplets from clustering in the mass spectrometer. In the sonic spray method, since the density of the droplets is high near the center of the nebulized flow, a more improved effect can be attained by diffusing the central portion of the nebulized flow, disposing the sampling hole (pass gate of droplets) to the peripheral portion of the diffused nebulized flow, and passing the droplets at the periphery into the mass spectrometer. Further, the density of the droplets near the inlet of the sampling orifice is made substantially constant, thereby making it possible for further stable measurement by disposing a small room between the diffuser and the sampling orifice, and disposing an exhaust vent for releasing the gas in the small room into atmospheric air.

Further, by changing the flow rate of the gas caused to flow for the outer circumference of the capillary in accordance with the amount of the specimen solution supplied, it is possible to always supply a gas in an amount enough to evaporate the sample solution. Alternatively, the amount of the specimen solution supplied may be changed in accordance with the flow rate of the gas caused to flow for the outer circumference of the capillary, and the specimen solution is supplied in an amount enough to be evaporated by the flow rate of the gas. Further, the gas flow rate may be changed depending on the kind of the solvent to be used.

Further, when the optimum gas flow rate and the specimen solution supply amount are automatically tuned based on the detection signal in the mass spectrometer unit, the burden on the users required for the adjusting operation can be reduced.

The foregoing as well as other objects, constitutions and effects and operations in accordance with the present invention will be apparent in view of the following detailed description of the preferred embodiments taken in conjunction with the drawings.

Figure 29:
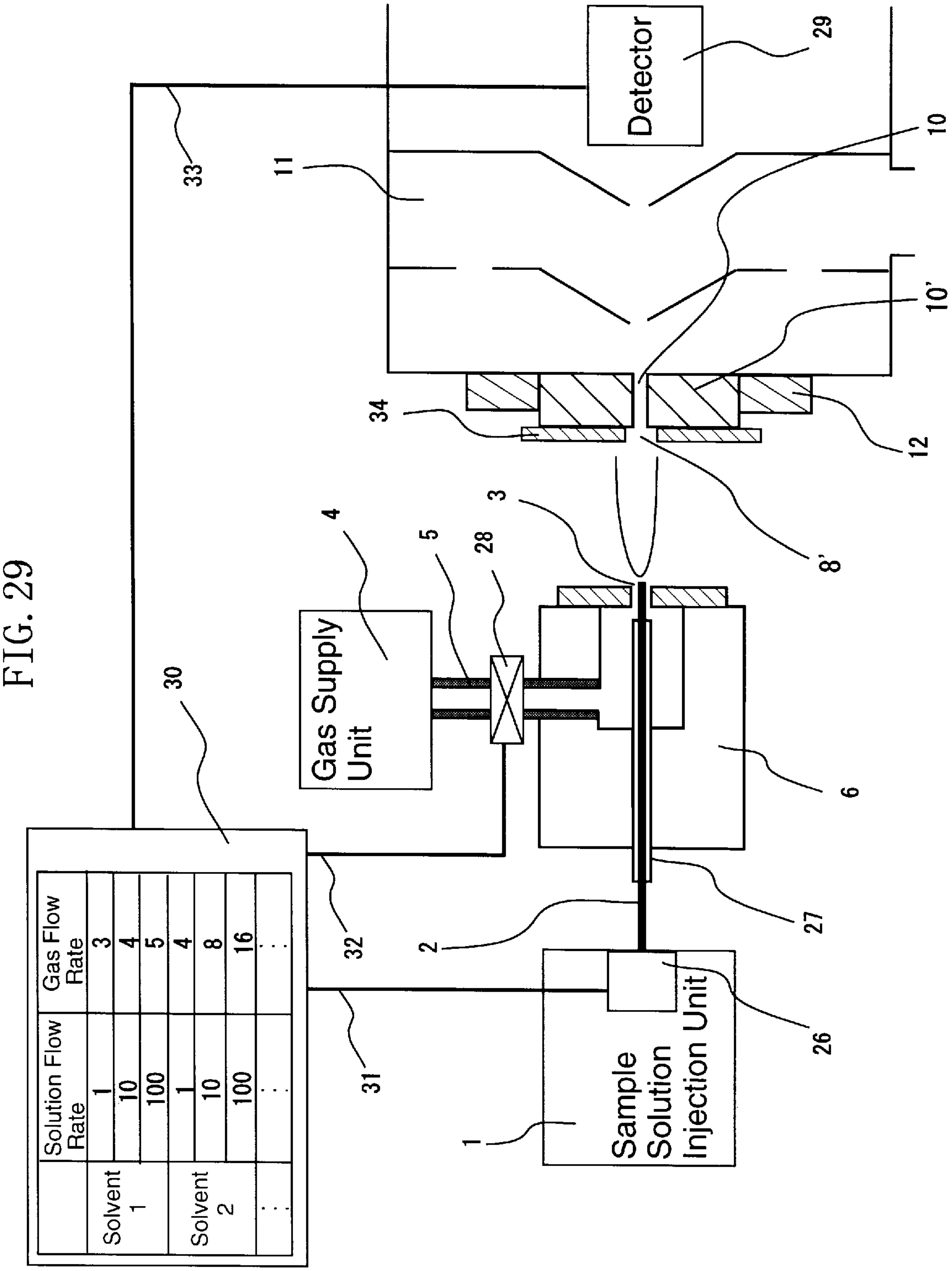
FIG. 29 is a view illustrating a schematic constitution of a mass spectrometer as a second embodiment according to the present invention.
Figure 31:
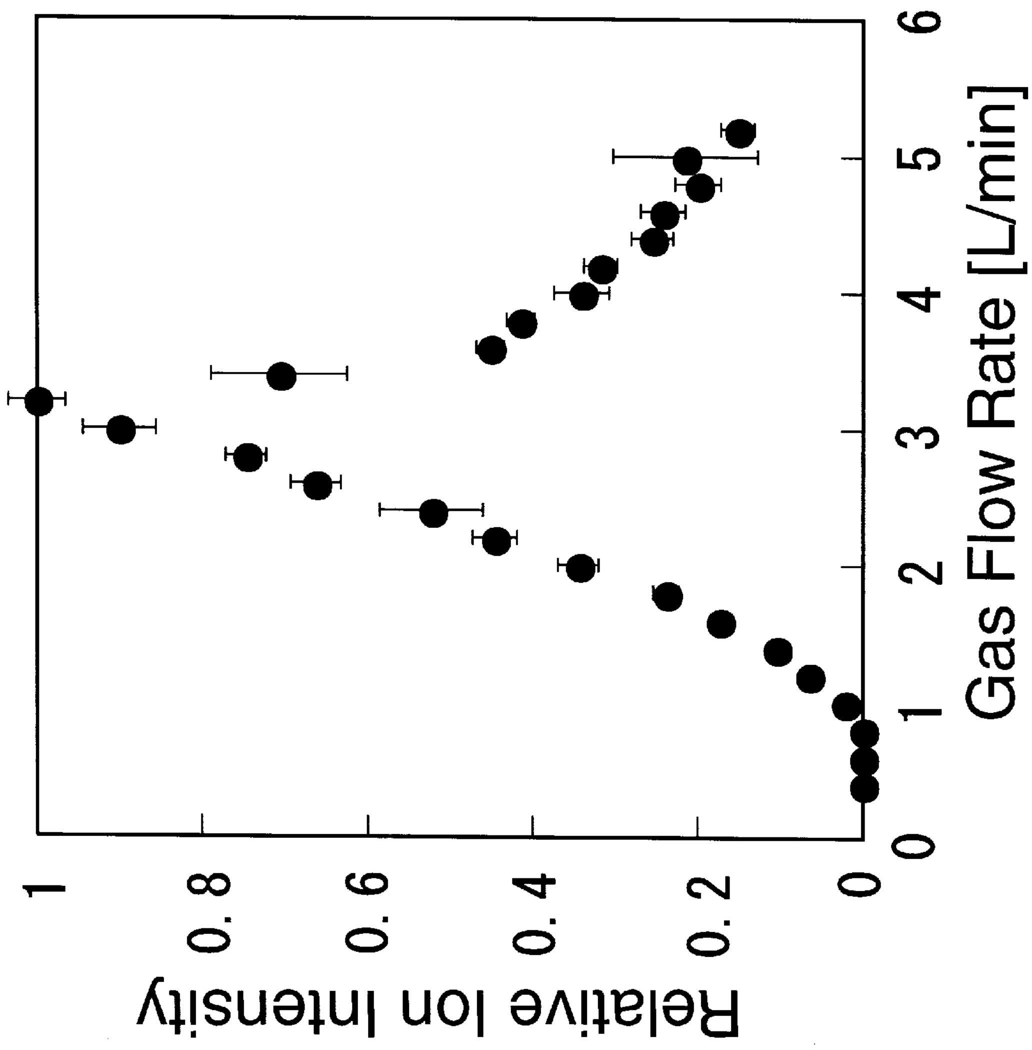
Figure 32:
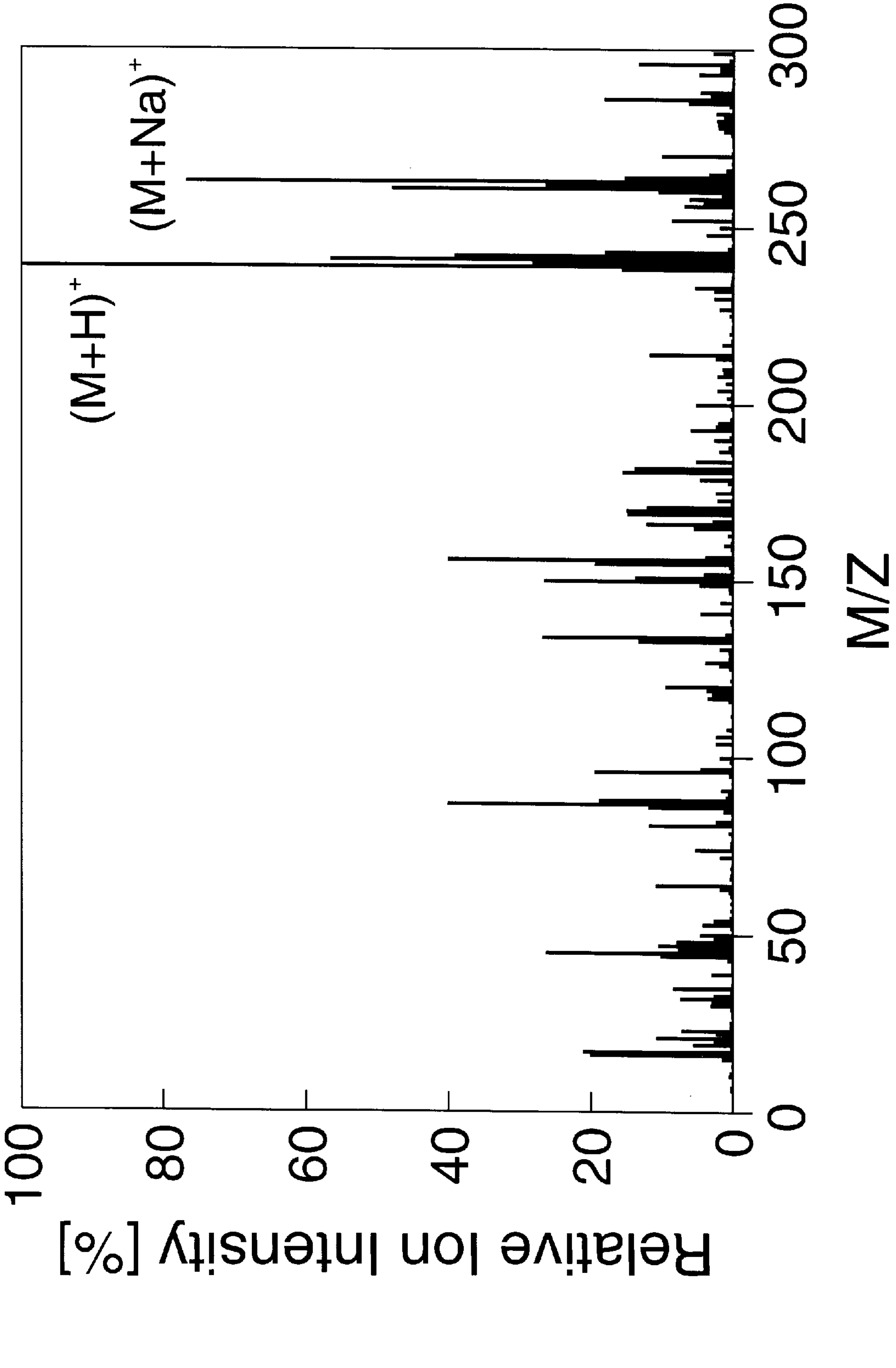
Figure 33:
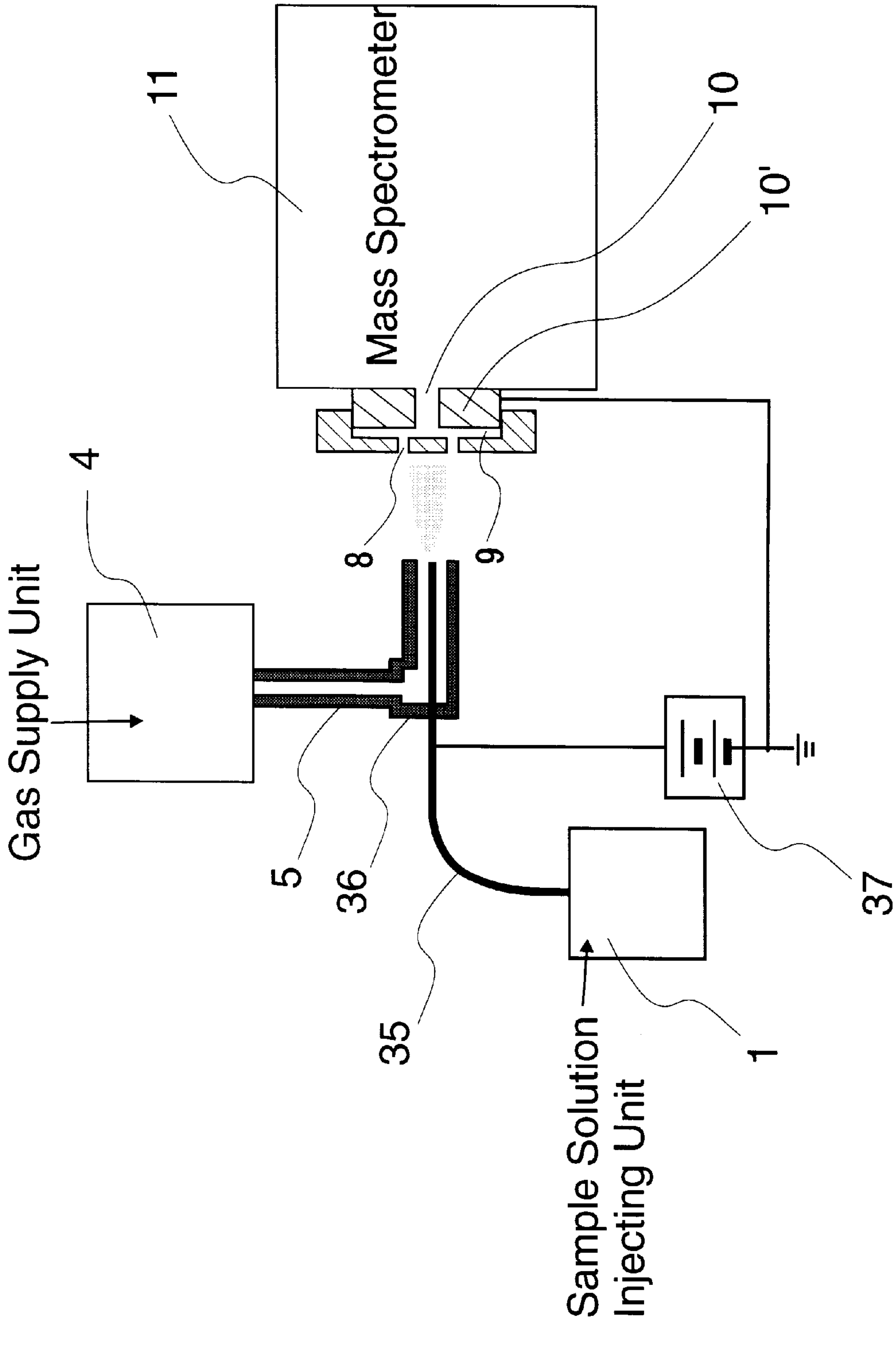

$\mu$l/min in the mass spectrometer as the second embodiment of the present invention shown in FIG. 29;

FIG. 31 is a relation between the ion intensity and the gas flow rate when the flow rate of the sample solution is at 30 $\mu$l/min in the mass spectrometer as the second embodiment of the present invention shown in FIG. 29;

FIG. 32 is a view illustrating an example of mass spectrum obtained by using the mass spectrometer according to the second embodiment of the present invention shown in FIG. 29; and FIG. 33 is a view illustrating a schematic constitution of a device in which the present invention is applied to a mass spectrometer using an ionization means by an ion spray method.

DETAILED DESCRIPTION OF THE PREFERRED EMBODIMENTS

The present invention will be explained more in details with reference to the drawings.

Figure 1:
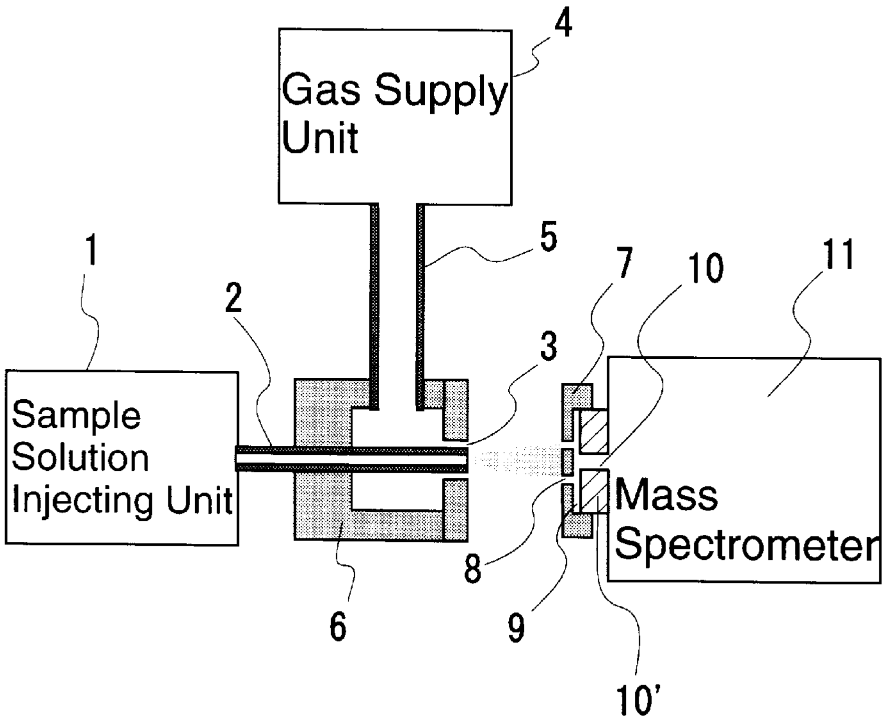
FIG. 1 is a view illustrating a schematic constitution of a mass spectrometer in a first embodiment according to the present invention.

FIG. 1 shows a schematic constitution of a mass spectrometer as a first embodiment according to the present invention. In FIG. 1, a sample solution supplied to a sample solution injecting unit 1 is introduced into a fused-silica capillary referred to as a capillary 2. The capillary 2 is fixed to an ion source housing 6, and the top end is inserted in an orifice 3. The top end of the capillary 2 is protruded by about −0.25 to +1.0 mm outward from the opening of the orifice 3. A spray gas supplied from a gas supply unit 4 is introduced by way of a gas tube 5 into the ion source housing 6, flows along the outer circumferential surface of the capillary 2 and is then jetted out from the gap to the orifice 3 to which the top end of the capillary 2 is inserted at a F/S ratio of about more than 200 m/s into atmospheric air. It is herein assumed that the flow rate of the gas converted as that under the standard condition (20° C., 1 atm) is F, and the cross sectional area of the gap at a position in which the gap between the capillary 2 and the orifice 3 is substantially minimized on a plane substantially in perpendicular to a central axis near the top end of the capillary 2 is S. As the spray gas, for example, nitrogen, argon, oxygen or air is used. The sample solution introduced into the capillary 2 is nebulized by a gas flow jetted along the top end of the capillary 2, and gaseous quasi-molecule ions of sample molecules are formed in addition to fine droplets (this method is a so-called sonic spray method). The formed droplets or ions are diffused by collision against a diffuser 7 disposed before a sampling orifice 10 disposed to vacuum wall 10' of a mass spectrometer 11, and those passing through the holes 8 disposed to the diffuser 7 are passed from the sampling orifice 10 into the mass spectrometer 11 and mass spectralyzed. A finite space 9 is present between the diffuser 7 and the sampling orifice 10. As the space 9, a finite small room may be disposed between the diffuser member 7 and the sampling orifice 10.

Instead of the ion source described above, an ion source of applying a voltage to the ion source housing 6 and applying an electric field or voltage to the sample solution may be used.

Figure 2:
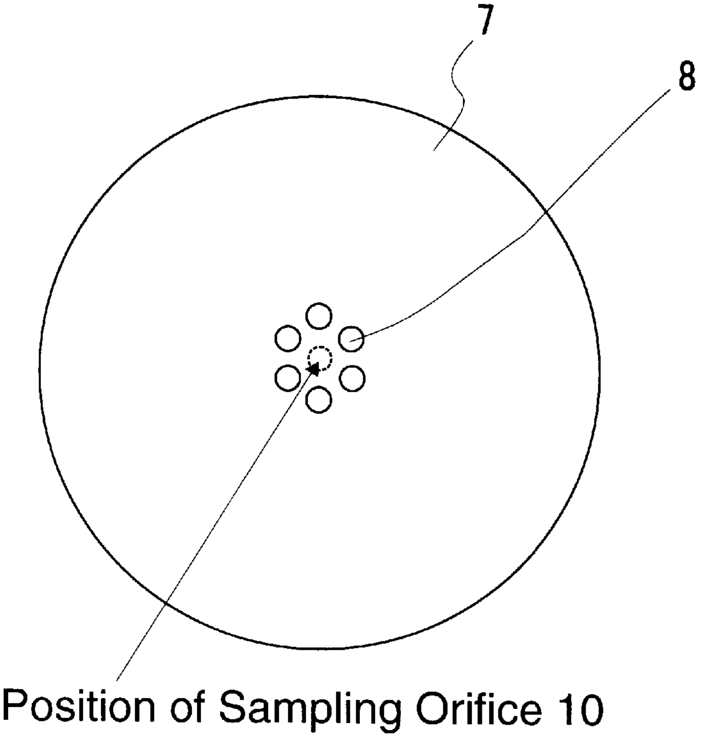
FIG. 2 is a view illustrating an example of a diffuser 7 in FIG. 1.

FIG. 2 shows an example of an actual constitution of the diffuser 7 in FIG. 1. In this embodiment, six small holes are circumferentially arranged about at a central portion of the disk-like diffuser 7. The six small holes 8 are disposed so as to surround the outer circumference of the sampling orifice 10 (so as to align the position of the sampling orifice with a plate-like portion surrounded by the six small apertures 8). Further, the central axis for the sampling orifice 10 is disposed so as to substantially coincide with the central axis of the capillary 2 for the ion source.

Description will now be made concerning the effect of disposing the diffuser 7.

Figure 3:
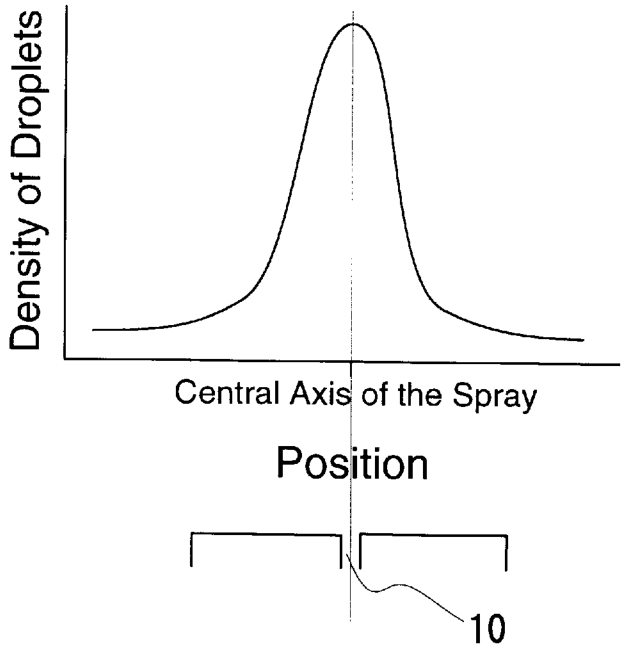
FIG. 3 is a view illustrating a distribution of droplets in a case of not using a diffuser 7 in the constitution of the device of FIG. 1.

The density of droplets formed in a nebulized flow by the sonic spray method is higher near the central axis of the nebulized flow and lower as apart from the central axis. The distribution for the density of the droplets is shown in FIG. 3. Since the central axis of the nebulized flow substantially coincides with the central axis for the capillary 2 when the capillary 2 and the sampling orifice 10 are disposed with their central axes coinciding substantially, a gas flow portion at high droplet density is passed from the sampling orifice 10 into the mass spectrometer 11. The droplets passed into a vacuum space of the mass spectrometer 11 are rapidly cooled by adiabatic expansion. When a gas at a high droplet density is cooled, since the droplets in the gas are clustered into larger droplets, analysis noises are caused.

Figure 4:
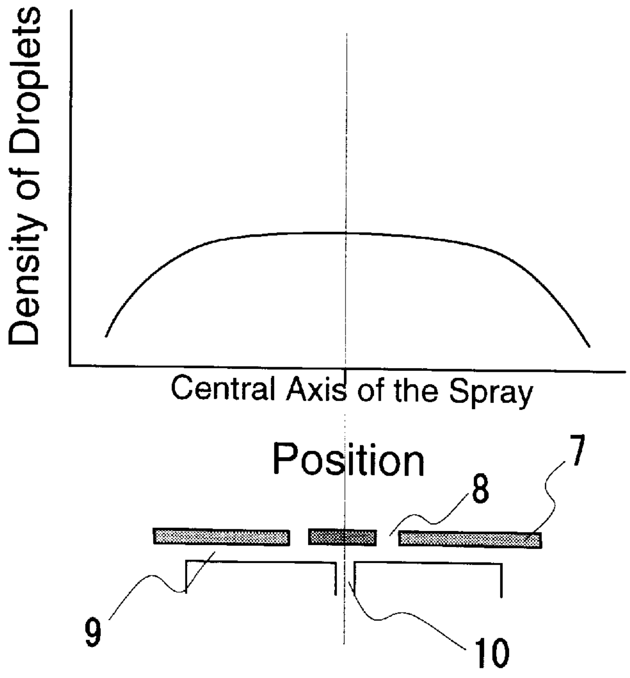
FIG. 4 is a view illustrating a distribution of droplets in a case of using a diffuser 7 in the constitution of the device of FIG. 1.

When the diffuser 7 is disposed in front of the sampling orifice 10 to diffuse the nebulized flow before the droplets are passed from the sampling orifice 10 into the mass spectrometer 11, the distribution of the droplet density is averaged as shown in FIG. 4. Accordingly, the droplet density in the gas flow passed from the sampling orifice 10 into the spectrometer is lowered and cluster less occurs even upon cooling by the adiabatic expansion and generation of analysis noises can be suppressed.

Figure 5:
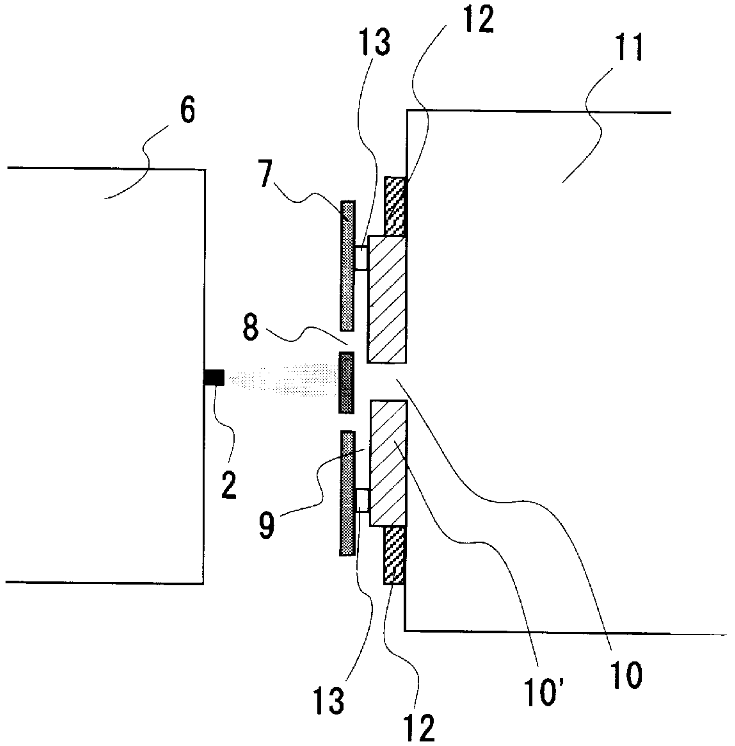
FIG. 5 is a view illustrating an example of an actual constitution of a part including the diffuser 7 of FIG. 1.

FIG. 5 is a cross-sectional view for a portion of a diffuser 7 and a sampling orifice 10 of a mass spectrometer 11 in a case where the diffuser 7 in FIG. 2 is formed as a flat member. The central axis for each of the six holes 8 disposed to the diffuser 7 and the central axis for the sampling orifice 10 are in parallel with each other but not present on a linear line. A spacer 13 is disposed between the diffuser 7 and a vacuum wall (a sampling orifice part) 10' of the mass spectrometer 11, to form a finite space 9 between the diffuser 7 and the sampling orifice part 10'. The sampling orifice part 10' is heated by a heater 12. Since the central axis for the capillary 2 in the ion source 6 and the central axis for the sampling orifice 10 are disposed so as to coincide with each other, the gas flow (nebulized flow) nebulized from the ion source 6 are not directly passed into the sampling orifice 10 but caused to collide against the diffuser 7 and diffused. The diffused droplets are passed by way of the holes 8 disposed spaced apart outwardly to the sampling orifice 10 and then passed from the sampling orifice 10 into the mass spectrometer 11.

Further, the diffuser 7 may be disposed in the vicinity of the sampling orifice part 10' as shown in FIG. 5, or may be disposed at a position not in the vicinity of but sufficiently spaced apart from the sampling orifice part 10'.

Figure 6:
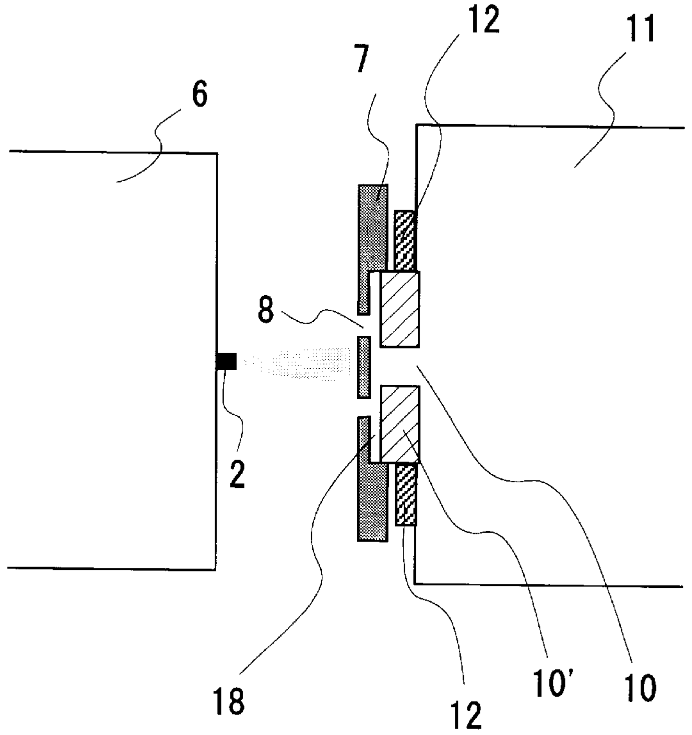
FIG. 6 is a view illustrating another example of an actual constitution of a part including the diffuser 7 of FIG. 1.

FIG. 6 illustrates another constituent embodiment of a diffuser. Also in this embodiment, the central axis for each of the six small holes 8 of the diffuser 7 and the central axis for the sampling orifice 10 are in parallel but not present along the same line. A recess is formed in the surface of the plate-like diffuser 7 on the side of the mass spectrometer, to define a finite small room 18 between the diffuser 7 and the sampling orifice 10. The sampling orifice part 10' is heated by the heater 12. Since the central axis for the capillary 2 in the ion source 6 and the central axis for the sampling orifice 10 are disposed so as to substantially coincide with each other, the gas flow nebulized from the ion source 6 is not directly passed into the sampling orifice 10 but diffused by the diffuser 7. The diffused droplets are entered by way of the holes 8 disposed spaced apart from the outside of the sampling orifice 10 into the small chamber 18, and then passes through the sampling orifice 10 and into the mass spectrometer 11.

The diffuser 7 may be disposed in adjacent with the sampling orifice part 10' or may be disposed at a position spaced apart sufficiently so as not to be in contact with the sampling orifice part 10'.

In the constituent embodiment of FIG. 4, FIG. 5 and FIG. 6, if the flow rate of the sample solution is relatively smaller, it may be disposed so that the central axis for the capillary 2 substantially coincides with the central axis for one of the holes 8.

Figure 7:
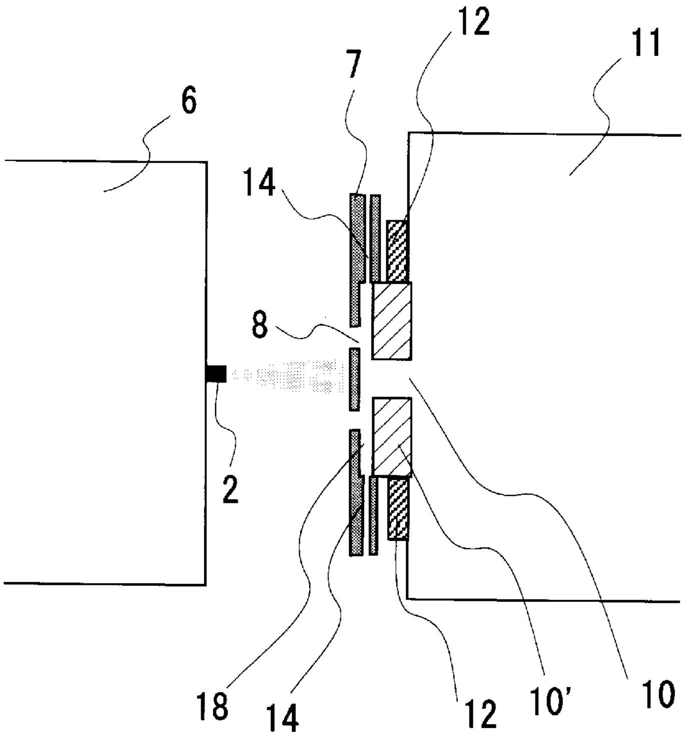
FIG. 7 is a view illustrating a further example of an actual constitution of a part including the diffuser 7 of FIG. 1.

FIG. 7 illustrate a further constituent embodiment of the diffuser 7. Also in this embodiment, the central axis for each of six holes 8 of the diffuser 7 and the central axis for the sampling orifice 10 are in parallel with each other but not present along the same line. A recess disposed to the surface of the diffuser 7 on the side of the mass spectrometer, to define a finite small chamber 18 between the diffuser 7 and the sampling orifice 10. Further, an exhaust vent 14 is disposed to the diffuser 7 so that the inside of the small chamber 18 is in communication with the atmospheric air, which can prevent increase of the gas pressure or the droplets density in the small hole 18. As the droplet density in the small chamber 18 is increased, since the droplet density passed through the sampling orifice 10 and taken into the mass spectrometer 11 is increased to cause noises, it is necessary to dispose the exhaust bent 14 to keep an value of the droplet density in the small room 18 appropriate. The sampling orifice part 10' is heated by the heater 12.

Since the central axis for the capillary 2 in the ion source 6 and the central axis for the sampling orifice 10 are disposed so as to substantially coincide with each other, the gas flow nebulized from the ion source is not passed directly into the sampling orifice 10 but is diffused by the diffuser 7. The diffused droplets are entered by way of the holes 8 into the small room 18, and then, are passed through the sampling orifice 10 and are entered into the mass spectrometer 11. Excess droplets in the small chamber 18 are released through the exhaust vent 14 into atmospheric air. The diffuser 7 may be disposed in adjacent with the sampling orifice part 10' as shown in FIG. 7 or it may be disposed at a remote position so as not to be in contact with the sampling orifice part 10'.

Figure 8:
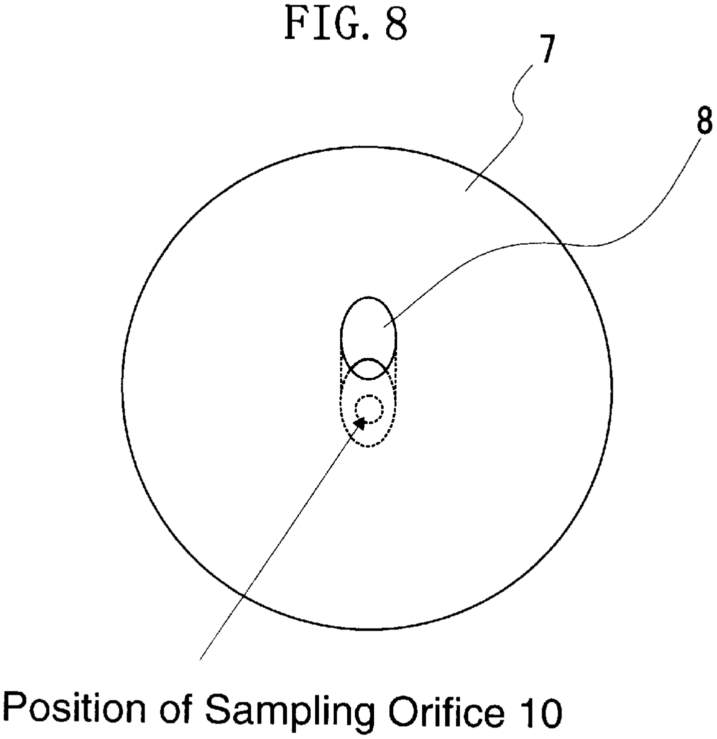
FIG. 8 is a view illustrating an example of another constitution of the diffuser 7 of FIG. 1.
Figure 9:
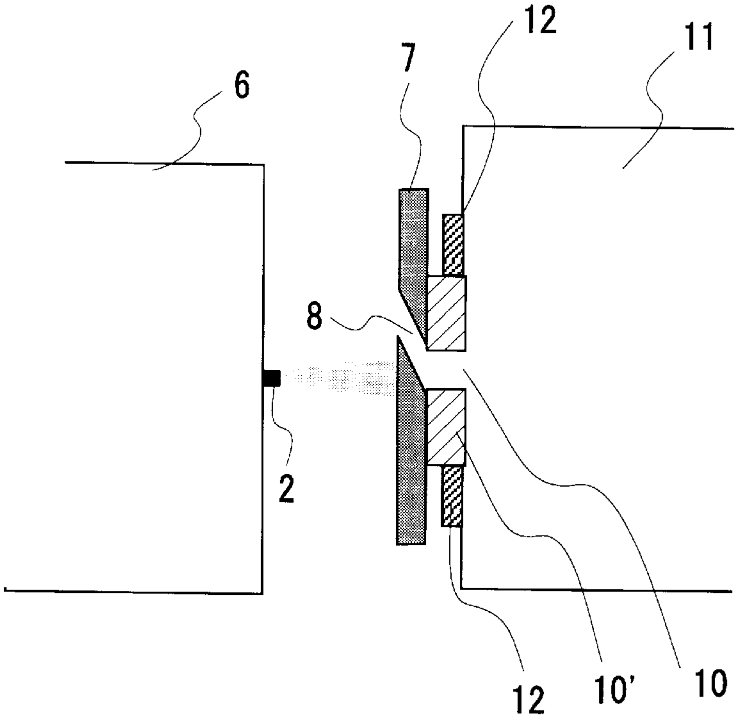
FIG. 9 is a view illustrating a further example of an actual constitution of a part including the diffuser 7 of FIG. 1.

FIG. 8 and FIG. 9 illustrate a further constituent embodiment of the diffuser 7. In this embodiment, one hole 8 is perforated obliquely to a disk-shaped diffuser 7. The sampling orifice 10 is disposed at a position aligned with the opening of the hole 8 on the side of the mass spectrometer. As shown in FIG. 9, the hole 8 is cut into an oblique shape so that the central axis for the hole 8 of the diffuser 7 and the central axis for the sampling orifice coincide with each other. The sampling orifice part 10' is heated by a heater 12. The gas flow nebulized from the capillary 2 of the ion source 6 is diffused upon collision against the edge of the hole 8 and then passed through an obliquely perforated hole 8, and passed from the sampling hole 10 into the mass spectrometer 11. This can decrease the density of the droplets passed into the mass spectrometer 11 like that in the embodiment described previously, and the analysis noises can be reduced. Also this diffuser 7 may be disposed so as to be in contact with the sampling orifice part 10' as shown in FIG. 9 or may be disposed being spaced apart from and not in contact with the sampling orifice part 10'.

Figure 10:
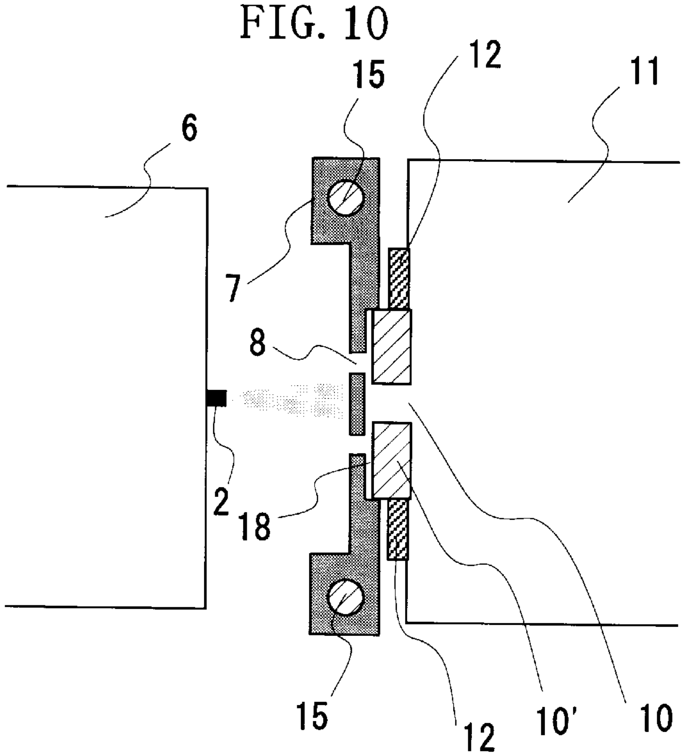
FIG. 10 is a view illustrating a further example of an actual constitution of a part including the diffuser 7 of FIG. 1.

FIG. 10 illustrates an embodiment for the constitution of a device in which a heating means is disposed to the diffuser

7. In this embodiment, a heating block 15 is provided to the diffuser 7, and the diffuser 7 is heated separately from the sampling orifice part 10' by the heating block 15.

Figure 11:
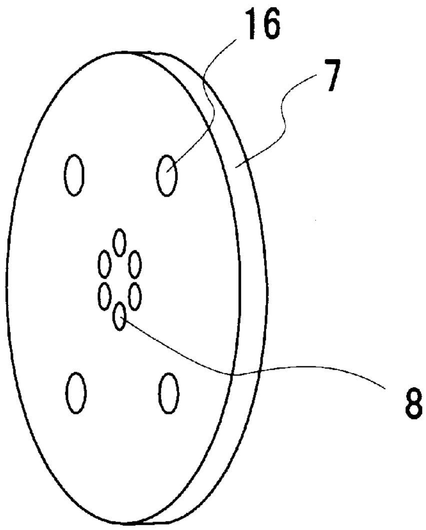
FIG. 11 is a view illustrating an example of another constitution of the diffuser 7 of FIG. 1.
Figure 12:
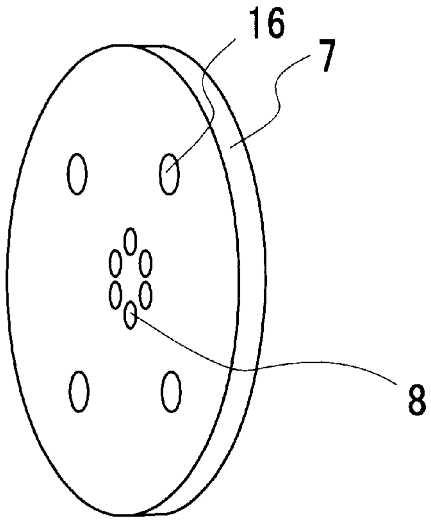
FIG. 12 is a view illustrating a view illustrating the shape of the diffuser 7 of FIG. 11 as viewed from the mass spectrometer unit.

FIG. 11 is a view for an actual diffuser 7 as viewed from the ion source. Six holes 8 are disposed circumferentially to a disk-like diffuser 7. Further, four screw holes 16 are disposed at the outer side of the holes 8. FIG. 12 is a view of the diffuser 7 in FIG. 11 as observed from the opposite side (from the mass spectrometer).

Figure 13:
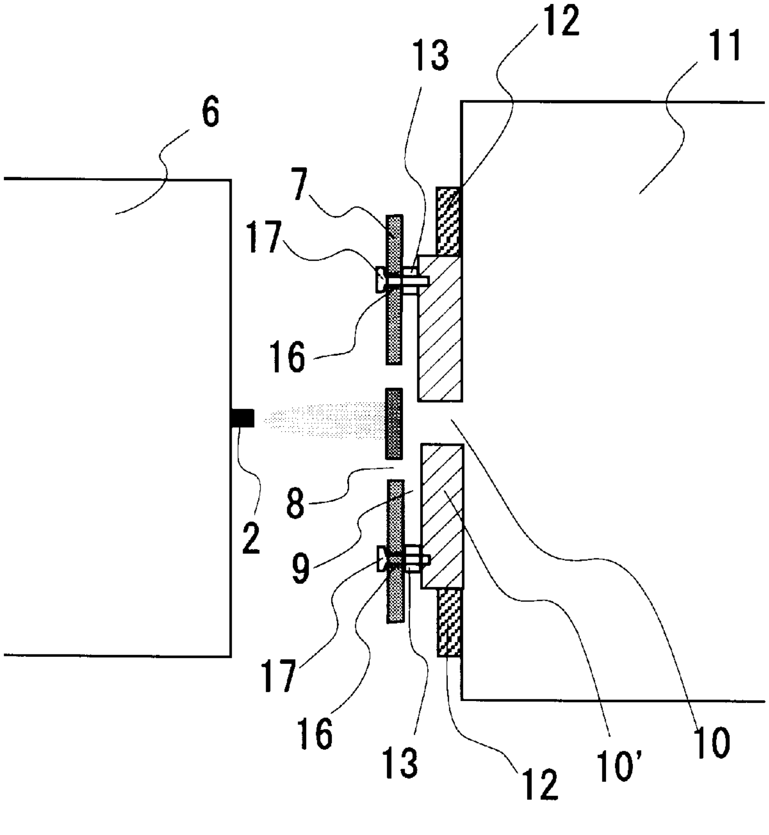
FIG. 13 is a view illustrating an example of an actual constitution of a part including the diffuser 7 of the mass spectrometer using the diffuser 7 of FIGS. 12 and 13.

FIG. 13 shows a state in which the diffuser shown in FIGS. 11 and 12 is attached to the mass spectrometer 11. The central axis for each of the six holes 8 of the diffuser 7 and the central axis for the sampling orifice 10 are in parallel with each other but not present on a linear line. The diffuser 7 is disposed so that the position for the sampling orifice 10 is aligned with a portion surrounded with the six holes 8. Further, the sampling orifice 10 is disposed so that the central axis of the capillary of the ion source 6 and the central axis for the sampling orifice 10 coincide substantially with each other. A spacer 13 is disposed between the diffuser 7 and the sampling orifice part 10', and the diffuser 7 is secured by way of the spacer 13 to the sampling orifice part 10' by screws 17 attached to the screw holes 16. This defines a finite space 9 between the diffuser 7 and the sampling orifice part 10'. The sampling orifice part 10' is heated by a heater 12. Since the central axis for the capillary 2 of the ion source 6 and the central axis for the sampling orifice 10 are disposed so as to coincide substantially with each other, the gas flow nebulized from the ion source 6 is not passed directly into the sampling orifice 10 but diffused by the diffuser 7. The diffused droplets are passed by way of the holes 8 and passed from the sampling orifice 10 into the mass spectrometer 11.

Figure 14:
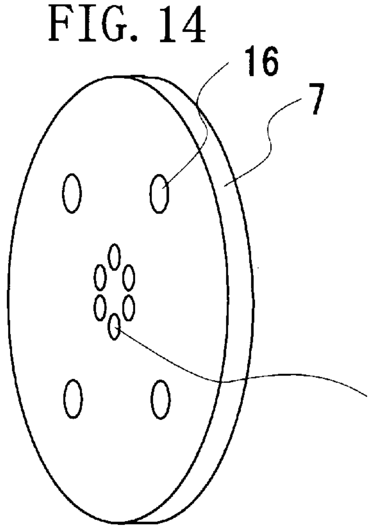
FIG. 14 is a view illustrating an example of another constitution of the diffuser 7 of FIG. 1.
Figure 15:
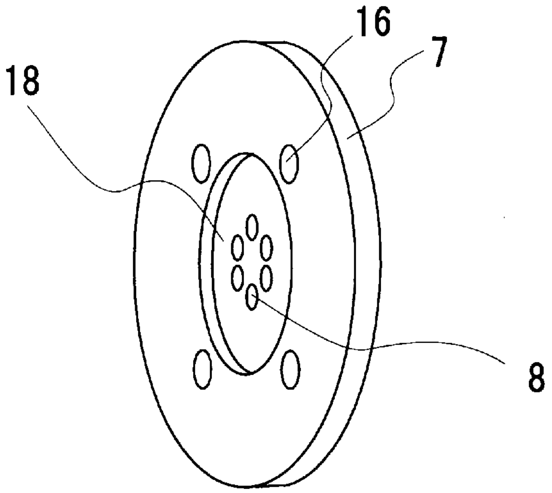
FIG. 15 is a view illustrating a view illustrating the shape of the diffuser 7 of FIG. 14 as viewed from the mass spectrometer unit.

FIGS. 14 and 15 illustrate another constituent embodiment of an actual diffuser 7. FIG. 14 is a view of the diffuser 7 as observed from the ion source and FIG. 15 is a view as observed from the mass spectrometer. Six holes 8 are disposed circumferentially to the disk-like diffuser 7 and four screw holes 16 are disposed to the outside of the holes 8. A circular recess is formed surrounding the holes 8 in the surface of the diffuser 7 on the side of the mass spectrometer, to define a small room 18 to the sampling orifice part 10'.

Figure 16:
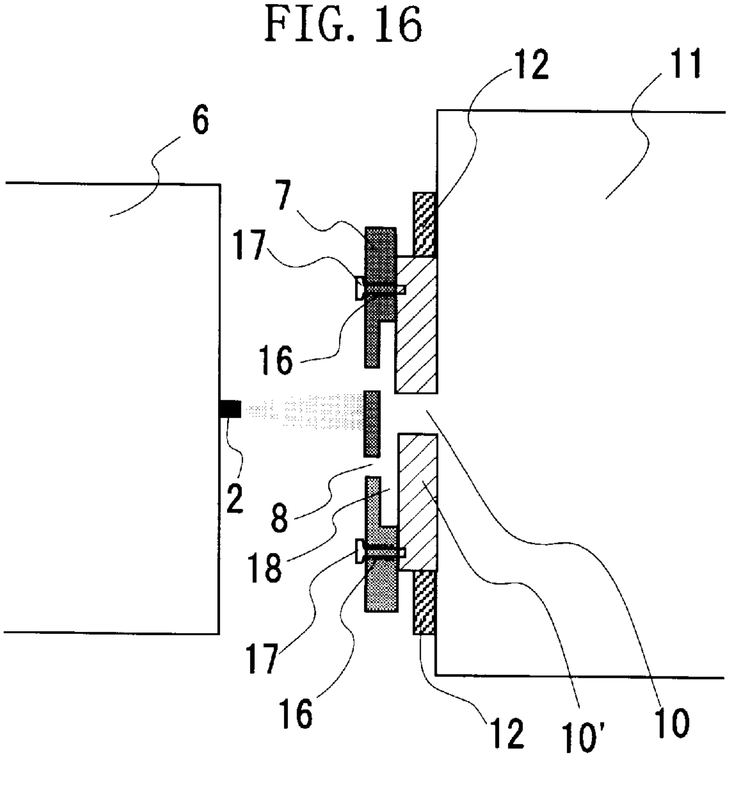
FIG. 16 is a view illustrating an example of an actual constitution of a part including the diffuser 7 of the mass spectrometer using the diffuser 7 of FIGS. 14 and 15.

FIG. 16 illustrates a state of attaching the diffuser 7 shown in FIGS. 14 and 15 to the mass spectrometer 11. The central axis for each of six holes 8 of the diffuser 7 and the central axis for the sampling orifice 10 are in parallel with each other but not present on a linear line. The sampling orifice 10 is disposed so as to be aligned with a portion of the diffuser 7 surrounded with the six holes 8. Further, also the central axis for the capillary 2 of the ion source 6 and the central axis for the sampling orifice 10 are disposed so as to be substantially coincide with each other. The diffuser 7 is secured by screws 17 attached to screw holes 16 to the sampling orifice part 10' of the mass spectrometer 11. Since the surface of the diffuser 7 on the side of the mass spectrometer is formed to have a recess with a circular shape, a finite small room 18 is formed between the diffuser 7 and the sampling orifice part 10'. The sampling orifice part 10' is heated by a heater 12. Since the central axis for the capillary 2 of the ion source 6 and the central axis for the sampling orifice 10 are disposed so as to substantially coincide with each other, a gas flow nebulized from the ion source 6 is not passed directly into the sampling orifice 10 but is diffused by the diffuser 7. The diffused droplets are passed by way of the holes 8 and from the sampling orifice 10 into the mass spectrometer 11.

Figure 17:
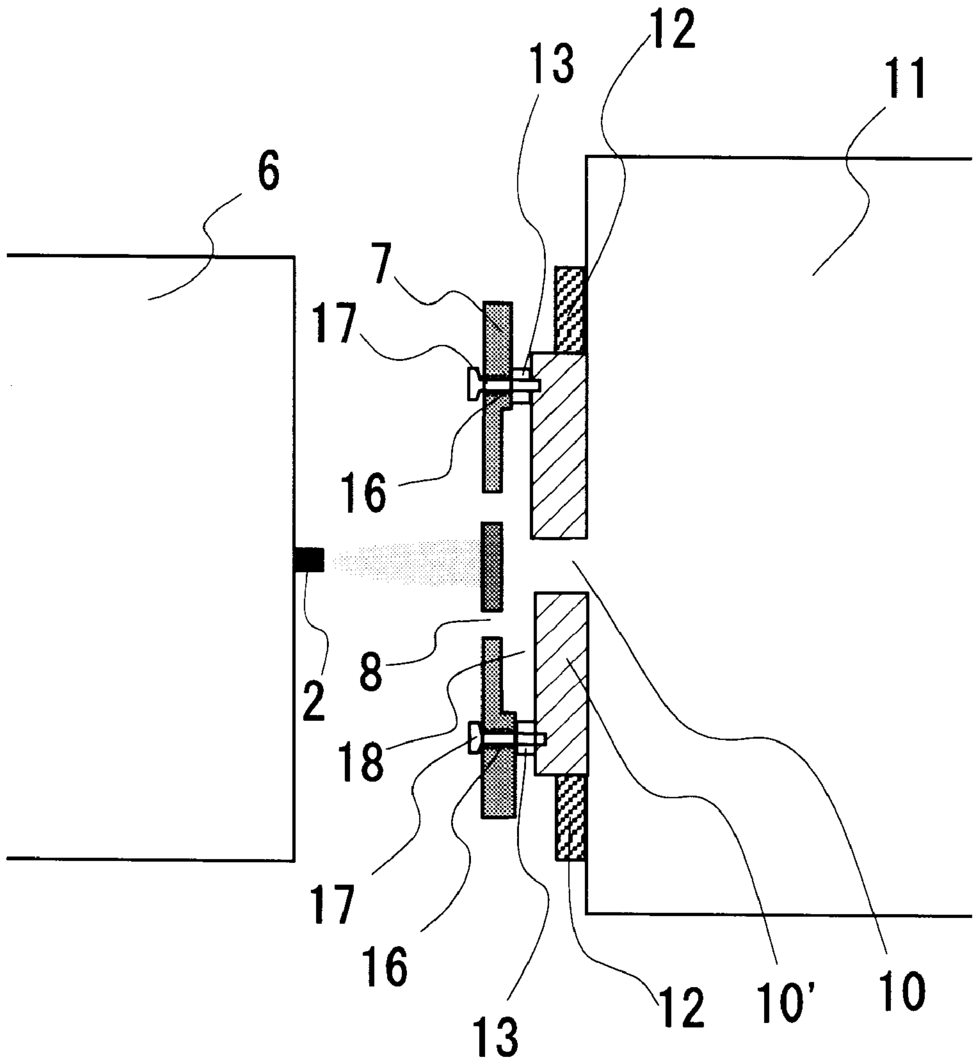
FIG. 17 is a view illustrating another example of an actual constitution of a part including the diffuser 7 of the mass spectrometer using the diffuser 7 of FIGS. 14 and 15.

Further, as shown in FIG. 17, a spacer 13 may be disposed between the diffuser 7 and the sampling orifice part 10' to release excess droplets in the small room 18 into atmospheric air.

Figure 18:
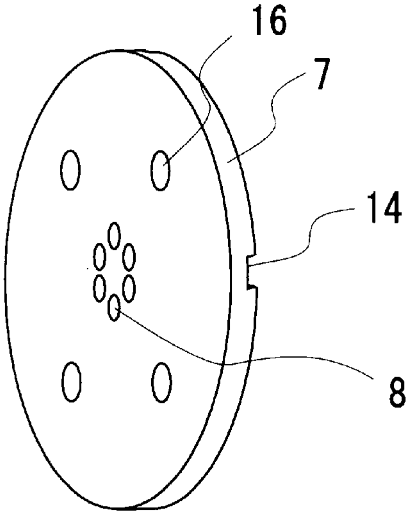
FIG. 18 is a view illustrating an example of another constitution of the diffuser 7 of FIG. 1.
Figure 19:
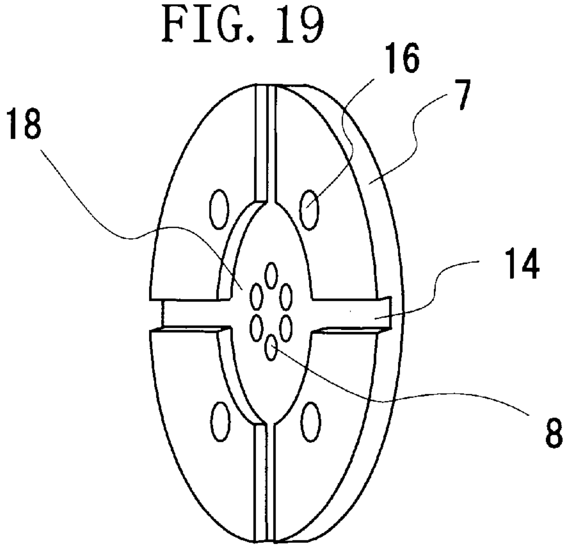
FIG. 19 is a view illustrating a view illustrating the shape of the diffuser 7 of FIG. 18 as viewed from the mass spectrometer unit.

FIG. 18 and FIG. 19 illustrate a still further constituent embodiment of an actual diffuser 7. FIG. 18 is a view of the diffuser 7 as observed from the ion source and FIG. 19 is a view thereof as observed from the mass spectrometer. Six holes are disposed circumferentially to a disk-like diffuser 7, and four screw holes 16 are disposed to the outer side thereof. As shown in FIG. 19, a circular recess is formed surrounding the holes 8 on the surface of the disk-like surface diffuser 7 on the side of the mass spectrometer to define a small room 18 to the sampling orifice part 10'. Further, four slots 14 extending from the small room 18 to the outer circumferential end of the diffuser 7 are formed to the diffuser 7, and the slots 14 serve as an exhaust vent for escaping excess droplets to the outside (atmospheric air) in the small room 18.

Figure 20:
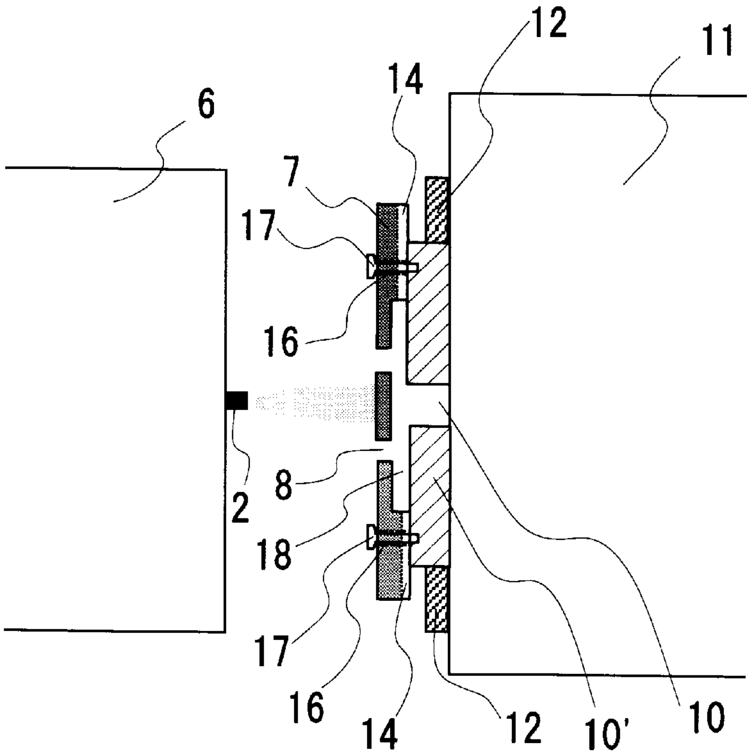
FIG. 20 is a view illustrating an example of an actual constitution of a part including the diffuser 7 of the mass spectrometer using the diffuser 7 of FIGS. 18 and 19.

FIG. 20 shows a state of attaching the diffuser 7 shown in FIG. 18 and FIG. 19 to the mass spectrometer 11. The central axis for each of six holes 8 of the diffuser 7 and the central axis for the sampling orifice 10 are in parallel with each other but not present on a linear line. The sampling orifice 10 is disposed so as to be aligned with a portion of a diffuser 7 surrounded with the six holes 8. Further, the central axis for the capillary 2 of the ion source 6 and the central axis for the sampling orifice 10 are disposed so as to substantially coincide with each other. The diffuser 7 is secured by means of screws 17 attached to screw holes 16 to the sampling orifice part 10'. Since the circular recess is formed in the surface of the diffuser 7 on the side of the mass spectrometer as described above, a finite small room 18 is formed between the diffuser 7 and the sampling orifice part 10'. Further, since the four slots 14 extending from the small chamber 18 to the outer circumferential end of the diffuser 7 are engraved to the diffuser 7, four exhaust vents connecting the small room 18 with an atmospheric air pressure space are formed. The sampling orifice part 10' is heated by a heater 12. Since the central axis for the capillary 2 of the ion source and the central axis for the sampling orifice are disposed so as to substantially coincide with each other, the gas flow nebulized from the ion source 6 is not directly passed into the sampling orifice but diffused by the diffuser 7. The diffused droplets are passed through the holes 8 and by way of the sampling orifice 10 and into the mass spectrometer 11. Excess droplets in the small room 18 are released from the exhaust vents 14 into the atmosphere.

Figure 21:
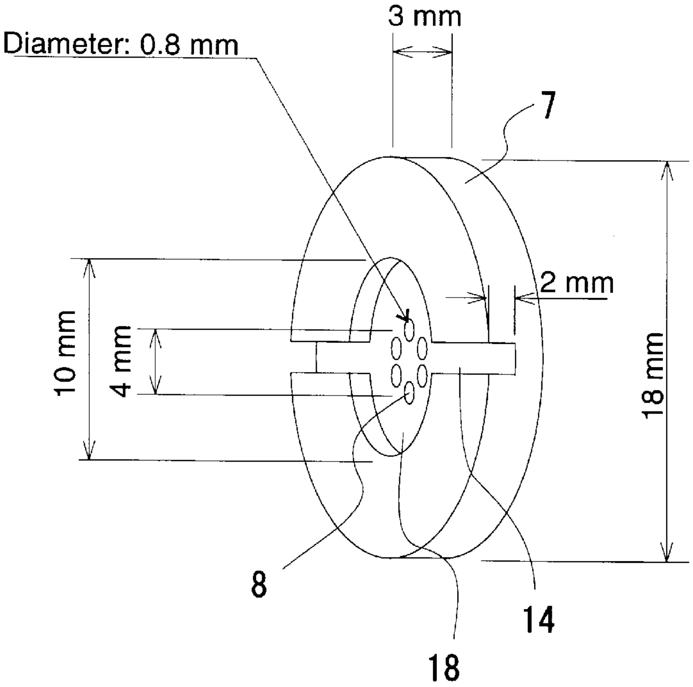
FIG. 21 is a view illustrating an example of another constitution of the diffuser 7 of FIG. 1.

FIG. 21 illustrates a further constituent embodiment of the diffuser 7. FIG. 21 is a view of the diffuser 7 as observed from the mass spectrometer. Six holes 8 are disposed circumferentially at a central portion of the disc-like diffuser 7. A portion including the holes 8 is formed in a circular recess to define a small room 18 between the diffuser and the sampling orifice part 10'. Further, two slots 14 extending from the small room 18 to the outer circumferential end of the diffuser 7 are engraved to the diffuser 7 to define an exhaust vent for escaping excess droplets in the small chamber 18 to the outside (in atmospheric air). The size for each of portions is as shown in FIG. 21.

Figure 22:
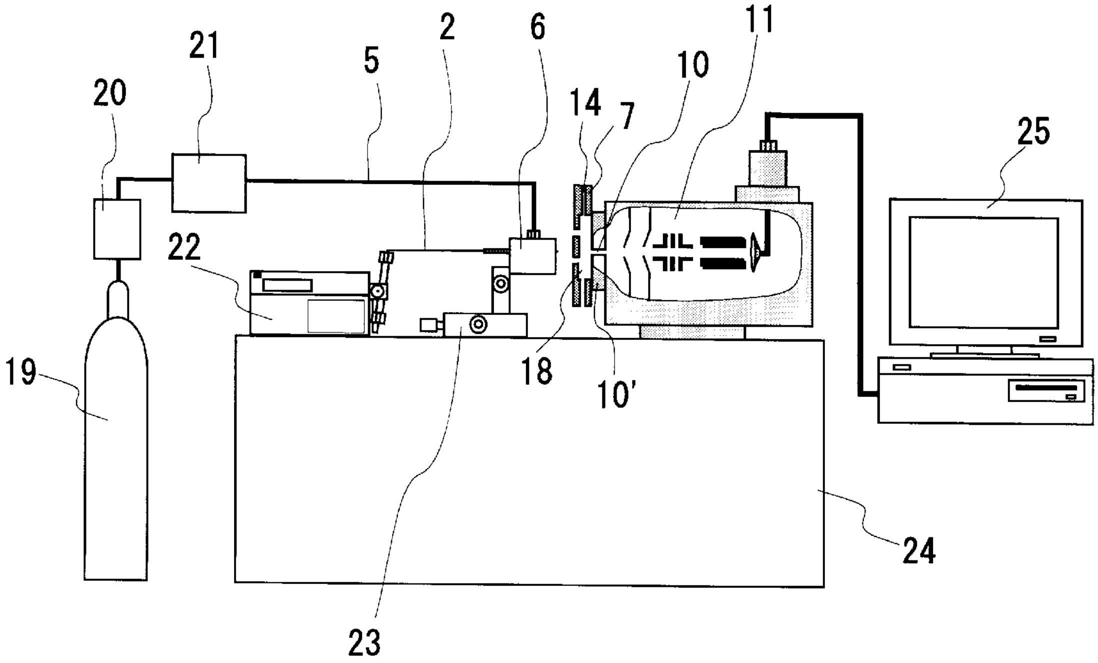
FIG. 22 is a view illustrating a schematic constitution of an entire combined device in which the mass spectrometer as the first embodiment of the present invention is combined with a liquid chromatograph.

FIG. 22 shows a constituent embodiment of the present invention in which the ion source and the mass spectrometer are directly combined with a liquid chromatograph. A sample solution separated by a liquid chromatograph 22 is introduced through a capillary 2 into an ion source housing 6. A gas supplied from a gas reservoir 19 is controlled for the flow rate by a regulator 20 and a gas flow controller 21 and introduced passing through a gas tube 5 into an ion source housing 6 and then caused to flow along the outer circumferential surface of the capillary 2. The sample solution introduced into the capillary 2 is nebulized by the gas flow caused to flow along the outer circumferential surface of the capillary, to form fine droplets, as well as gaseous quasi-molecule ions of the molecules of a sample ingredient. The droplets or ions are diffused by being collided against a diffuser 7, and the diffused droplets or ions are passed through a holes 8 disposed in the diffuser 7, passed from the sampling orifice 10 into a mass spectrometer 11 and mass spectralyzed. The analyzed data by the mass spectrometer is sent to a personal computer 25, memorized and computed. The inside of the mass spectrometer 11 is kept evacuated by a vacuum pump in an vacuum exhaust system 24. An infinite small chamber 18 is disposed between the diffuser 7 and the sampling orifice part 10', and the inside of the small chamber 18 is connected by the exhaust vent 14 with an atmospheric pressure space. Further, the ion source housing 6 is placed on an XYZ stage 23, by which the position of the ion source relative to the mass spectrometer 11 can be adjusted finely.

Figure 23:
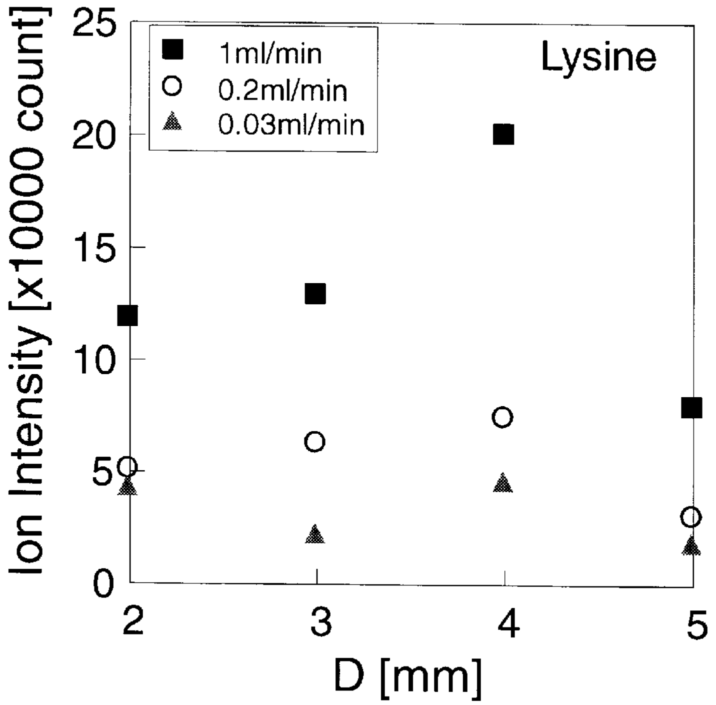
FIG. 23 is a view illustrating a relation of a distance between holes disposed orthogonally to each other in a case of using a diffuser 7 having six holes 8 disposed on the circumference in the mass spectrometer shown in FIG. 1 to the ion intensity of singly doubly protonated ions of lysine.

FIG. 23 shows a relation between the distance D between two holes situated orthogonally with each other among the holes 8 disposed circumferentially on the diffuser 7 (diameter D for a circle along which centers of the holes 8 are arranged), and the ion intensity of singly protonated lysine ions observed by the mass spectrometer 11. The sample solution is an aqueous methanol solution of 1 $\mu$mol/l lysine. The distance between the surface of the diffuser 7 on the side of the ion source and the ion source housing 6 (top end of capillary 2) is about 3 mm (when the top end of the capillary 2 protrudes by about 0.1 mm from the ion source housing 6). In the figure, solid square marks indicate a solution flow rate at 1 ml/min, blank circular marks indicate a solution flow rate at 0.2 ml/min and solid trigonal mark indicates a case of a solution flow rate at 0.03 ml/min. The ion intensity is highest at D=4 mm.

Figure 24:
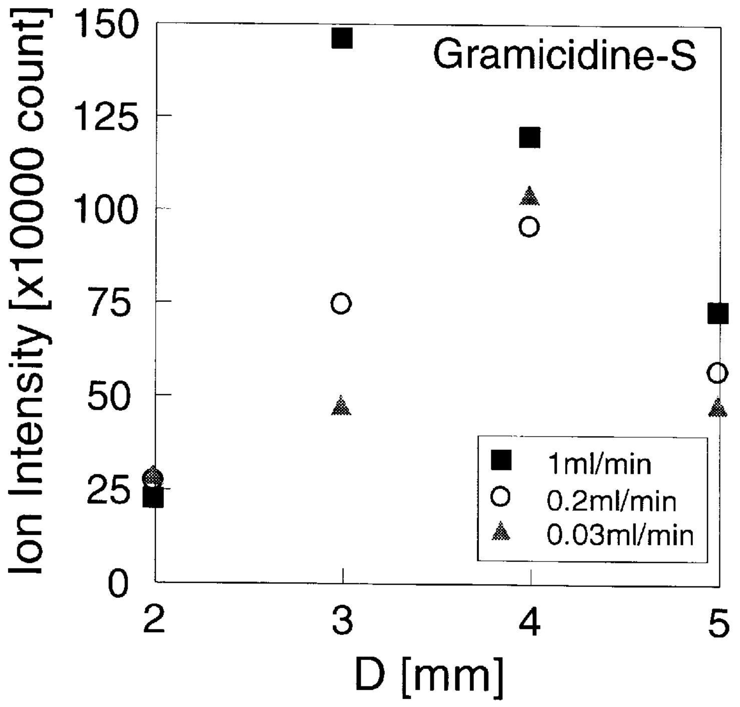
FIG. 24 is a view illustrating a relation of a distance between holes disposed orthogonally to each other in a case of using a diffuser 7 having six holes 8 disposed on the circumference in the mass spectrometer shown in FIG. 1 to the ion intensity of doubly protonated ions of gramicidin S.

FIG. 24 shows a relation between the distance D between the holes 8 on the diffuser 7, and the ion intensity of doubly protonated ions of glamicidine-S. In the figure, the ordinate represents the ion intensity (relative intensity) and the abscissa indicates the hole distance D. The sample solution is an aqueous methanol solution of 1 $\mu$mol/l gramicidin S. The distance between the surface of the diffuser 7 on the side of the ion source and the ion source housing 6 is 3 mm. In the figure, the solid square marks indicate a solution flow rate at 1 ml/min, blank circular marks indicate a solution flow rate at 0.2 ml/min and solid trigonal marks indicate a solution flow rate at 0.03 ml/min. From the figure, it can be seen that the ion intensity is high at D=3 mm or 4 mm.

It can be seen from FIG. 23 and FIG. 24 that the optimum distance D for the hole 8 is not less than 3 mm and not more than 4 mm in a case where the distance between the surface of the diffuser 7 and the ion source housing 6 is 3 mm. Considering the foregoings, the distance D for the holes 8 and the distance H between the ion source housing 6 and diffuser 7 are preferably adjusted so that the apex of an isosceles triangle having the hole distance D as the base and the distance H between the ion source housing 6 and the surface of the diffuser 7 as the height is within a range from 53 to 64 degree.

Figure 25:
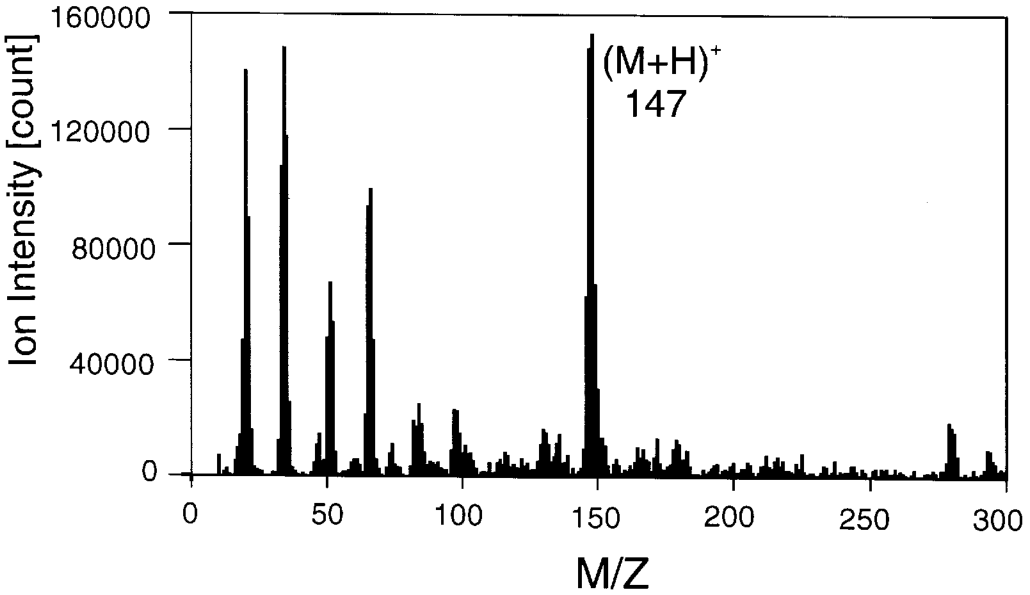
FIG. 25 is a view illustrating a mass spectrum of lysine when the flow rate of a sample solution obtained in a case of using the diffuser 7 in the mass spectrometer shown in FIG. 1 is at 1 ml/min.

FIG. 25 shows mass spectra obtained from an aqueous methanol solution of 1 $\mu$mol/l lysine in a case where the diffuser 7 according to the present invention is disposed and the solution flow rate is set to 1 ml/min. Since the density of droplets passed into the mass spectrometer 11 is appropriate, fine spectra can be obtained with S/N ratio being 27.

Figure 26:
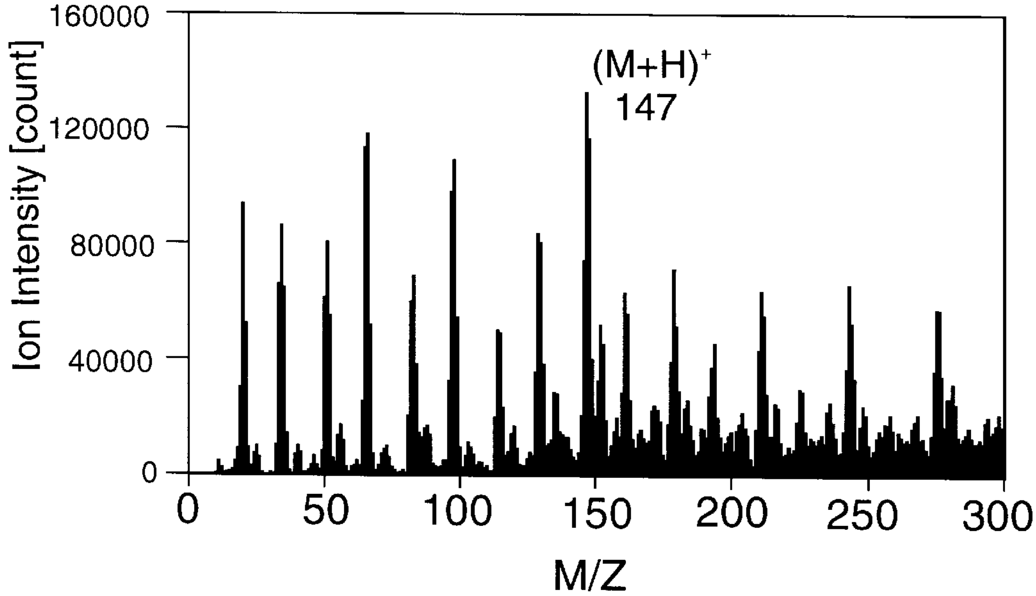
FIG. 26 is a view illustrating a mass spectrum of lysine when the flow rate of a sample solution obtained in a case of not using the diffuser 7 in the mass spectrometer shown in FIG. 1 is at 1 ml/min.

FIG. 26 shows mass spectra measured under the same conditions as those in FIG. 25, without disposing diffuser 7 according to the present invention. In this case, since excess droplets are passed into the mass spectrometer 11, peaks of so-called cluster ions formed by coagulation of many solvent molecules appear. Further, the S/N ratio is reduced to be as low as 7.

Figure 27:
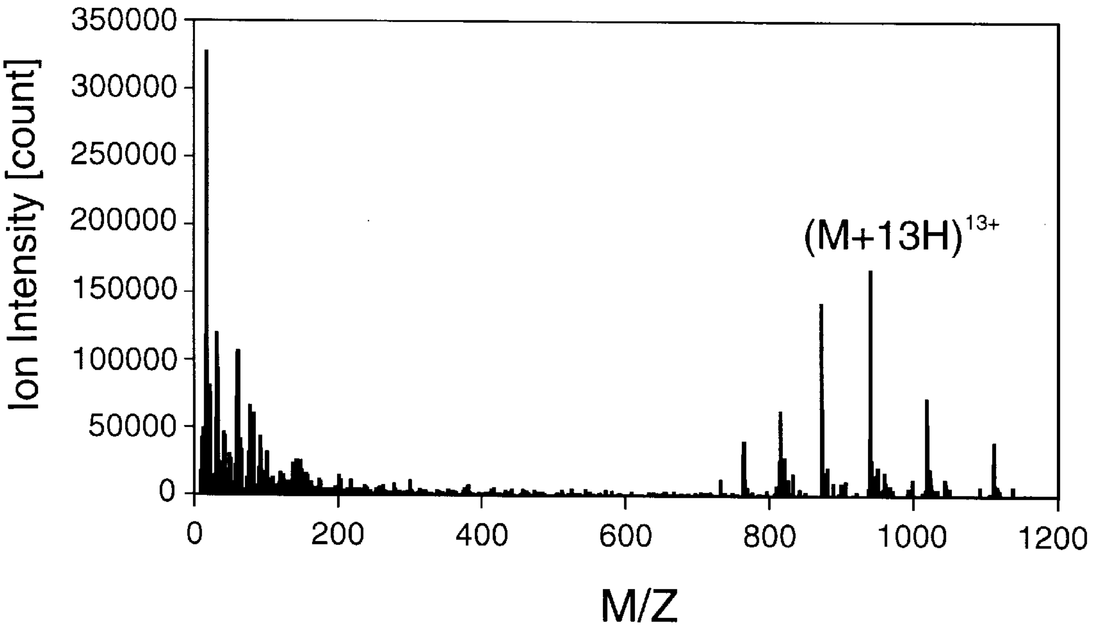
FIG. 27 is a view illustrating a mass spectrum of cytochrome C when the flow rate of a sample solution obtained in a case of using the diffuser 7 in the mass spectrometer shown in FIG. 1 is at 1 ml/min.

FIG. 27 show mass spectra obtained from a solution of 1 μmol/l cytochrome C in a case where the diffuser 7 according to the present invention is disposed and the solution flow rate is set to 1 ml/min. A series of multiply-charged ions of cytochrome C are observed. In this case, an ion source of applying a voltage to the ion source housing 6 and applying an electric field (or voltage) to a sample solution is used. It was impossible by the prior art to measure the multiply-charged ions of proteins at such a high solution flow rate but according to the present invention, the multiply-charged ions can be measured effectively by the mass spectrometer with the diffuser 7 even at a high solution flow rate of 1 ml/min.

Figure 28:
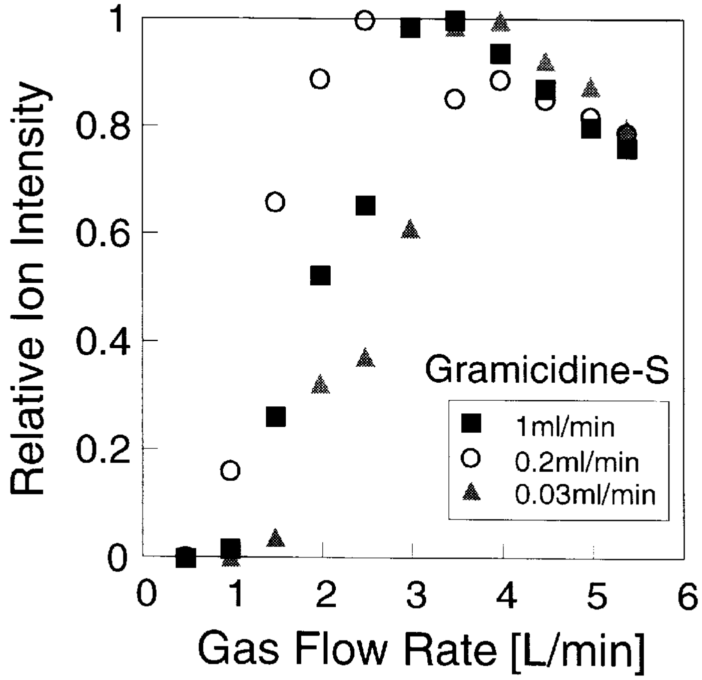
FIG. 28 is a view illustrating a relation between the ion intensity and the gas flow rate when the flow rate of the sample solution is at 1, 0.2, 0.03 ml/min in the mass spectrometer shown in FIG. 1.

FIG. 28 shows a relation between the ion intensity and the gas flow rate at the solution flow rate of 1 ml/min, 0.2 ml/min and 0.03 ml/min. The abscissa indicates the gas flow rate and the ordinate indicates the ion intensity (relative intensity). In the figure, solid square marks indicate a solution flow rate at 1 ml/min, blank circular marks indicates a solution flow rate at 0.2 ml/min and solid trigonal marks indicate a solution flow rate at 0.03 ml/min. The ion intensity at each of the solution flow rates is the highest at a gas flow rate of 3 to 4 l/min and the difference depending on the solution flow rate is relatively small. Accordingly, it can be seen that adjustment for the gas flow rate is not required so long as the solution flow rate changes only slightly. As described above, adjustment for the gas flow rate is simplified by providing the diffuser 7.

In a case of not using the diffuser 7 as shown in the first embodiment, a gas flow rate is changed in accordance with the change of a solution flow rate, to supply a gas in an amount sufficient to evaporate the sample solution, or the solution flow rate is changed in accordance with the gas flow rate, to supply the sample solution in an amount sufficient to be evaporated by the gas flow rate. Further, it is desirable to supply the gas at an optimum flow rate in accordance with the kind of the solvent. In this embodiment, explanation will be made to a constituent embodiment of the device in such a case. In this case, the value for the usable solution flow rate is relatively low. Further, in this embodiment, explanation will be made also to a method of conducting auto-tuning for the optimum gas flow rate and solution flow rate based on a detection signal at the mass spectrometer.

FIG. 29 shows a schematic constitution of a mass spectrometer in this embodiment. A sample solution supplied to a sample solution injection unit 1 is fed by a pump 26 and introduced into a capillary 2. The pump 26 is controlled by a control unit 30 and can vary the flow rate of the solution to be delivered. A control signal from the control unit 30 is transmitted by way of a signal line 31 to the pump 26. The control unit 30 conducts automatic control, as well as the control conditions can be changed by a user by inputting appropriate operation conditions again. The capillary 2 is inserted through a metallic capillary 27 so as not to be bent, and the metallic capillary 27 is fixed to an ion source housing 6. The top end of the capillary 2 is protruded out of the metallic capillary 27 and the top end is inserted into an orifice 3. The top end of the capillary 2 is protruded by about −0.25 to +1.0 mm from the opening of the orifice 3. A spray gas supplied from a gas supply unit 4 is introduced passing through a gas tube 5 and an electromagnetic valve 28 into the ion source housing 6. The electromagnetic valve 28 is controlled by the control unit 30 and can change a gas flow rate. The control signal from the control unit 30 is transmitted by way of a signal line 32 to the electromagnetic valve 28. The control unit 30 conducts automatic control, as well as a user can change control conditions by inputting operation conditions appropriately. A spray gas introduced into the ion source housing 6 flows along the outer circumferential surface at the top end of the capillary 2 and jetted into atmospheric air through a gap of the orifice 3 to which the top end of the capillary 2 is inserted. For the spray gas, nitrogen, argon, oxygen, air or the like is used. The sample solution in the capillary 2 is nebulized by a gas flow jetting along the top end of the capillary 2 into the atmospheric air to form fine droplets, as well as gaseous quasi-molecule ions of the molecules of sample ingredients. The formed ions are passed through a hole 8' disposed in a cover 34 and passed from an ion intaking sampling orifice 10 disposed to a sampling orifice part 10' into a mass spectrometer 11 and mass spactralyzed, and then the ion intensity is detected by a detector 29. Further, the sampling orifice part 10' is heated by a heater 12. The detector 29 is connected by way of a signal line 33 to the control unit 30 and sends a detection signal to the control unit 30.

Instead of the ion source described above, an ion source of applying a voltage to the ion source housing 6 while applying an electric field (or voltage) to a sample solution may also be used.

Control operation by the control unit 30 will be explained more specifically. The control unit 30 is connected to the pump 26, the electromagnetic valve 28 and the detector 29 by way of the signal lines 31, 32 and 33 respectively to always obtain three kinds of information including the solution flow rate, gas flow rate and detected ion intensity. Further, a table for a gas flow rate required in accordance with the kind of the solvent and the flow rate of the solution is provided in the control unit 30, and the solution flow rate and/or gas flow rate are automatically set and controlled based on the obtained information and the kind of the solvent or the like inputted by the user. Further, the control unit 30 always monitors the detected ion intensity obtained by the detector 29 and automatically controls the solution flow rate and the gas flow rate so that the detected ion intensity is made further higher. Thus, the user is enabled to conduct measurement without manual adjustment for the gas flow rate or the solution flow rate. Further, the control unit 30 is also adapted for enabling manual setting and a user can operate the system while optionally setting the gas flow rate and the solution flow rate. Further, it is also possible to fix the controlling amount irrespective of the detection signals from the detector 29. Further, also when the user manually sets initial values for the gas flow rate and the solution flow rate, the control unit 30 can monitor the detected ion intensity to automatically control each of the flow rates (auto-tuning).

Figure 30:
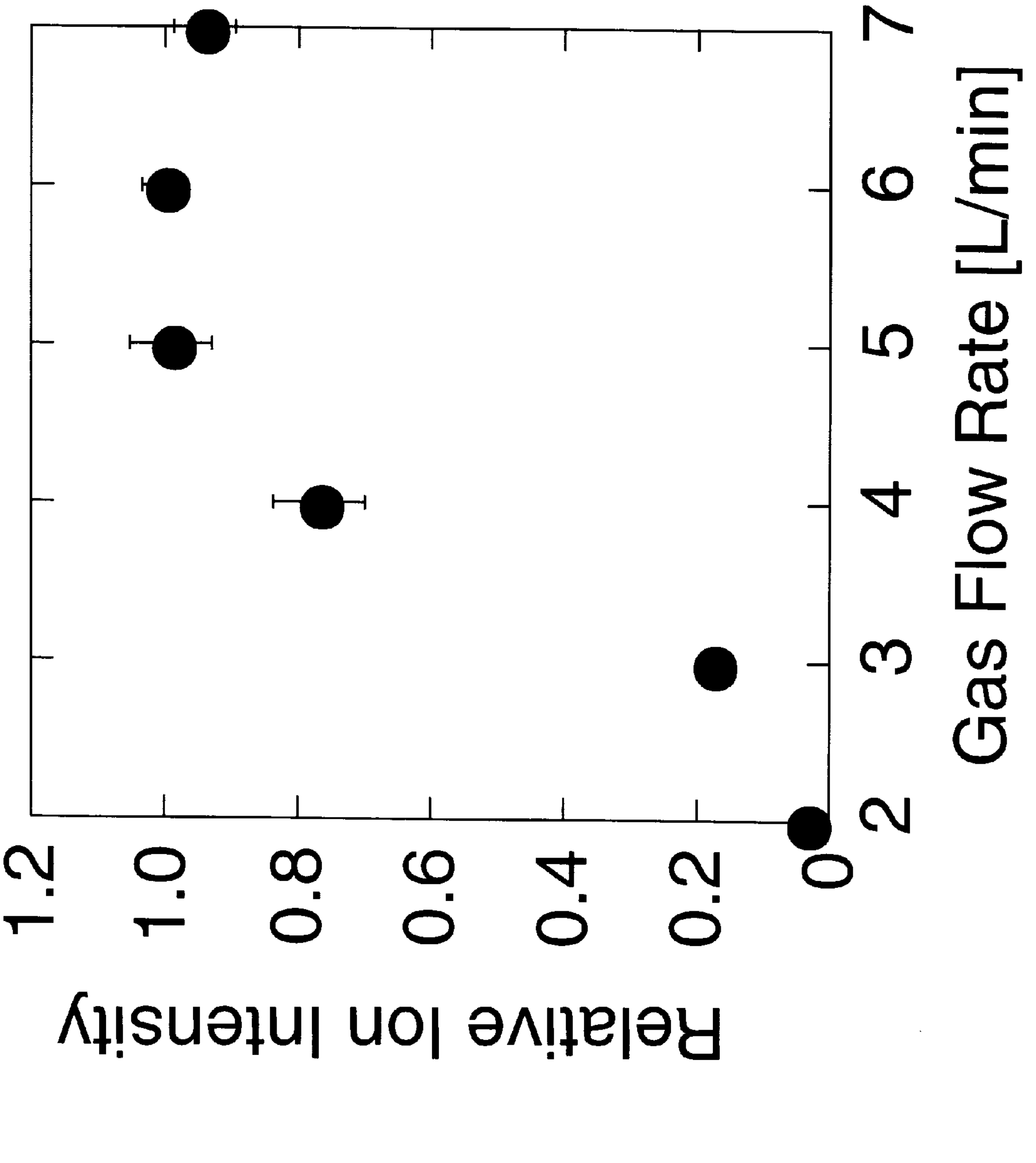
FIG. 30 is a relation between the ion intensity and the gas flow rate when the flow rate of the sample solution is at 200

FIG. 30 and FIG. 31 show that the gas flow rate required for ionization of sample ingredients is different depending on the flow rate of the sample solution. FIG. 30 shows a relation between the gas flow rate and the ion intensity at a solution flow rate of 200 μl/min. In the figure, the abscissa indicates the gas flow rate and the ordinate indicates the ion intensity (relative intensity). The ion intensity is maximum at the gas flow rate of 6 l/min and it can be seen that the gas flow rate may be 6 l/min at the flow rate of the sample solution of 200 μl/min. FIG. 31 shows a relation between the gas flow rate and the ion intensity at a solution flow rate of 30 μl/min. In the figure, the abscissa indicates the gas flow rate and the ordinate indicates the ion intensity (relative intensity). The ion intensity is maximum at the gas flow rate of 3 l/min and it can be seen that the gas flow rate may be 3 l/min at a flow rate of the sample solution of 30 μl/min.

The control unit 30 shown in FIG. 28 memorizes the relation shown in FIG. 30 and FIG. 31 as a table and controls the flow rate of the sample solution and the flow rate of the spray gas based on the table.

FIG. 32 shows mass spectra obtained by using the mass spectrometer as the second embodiment of the present invention. The sample solution comprises 10 μmol/l of thiuram dissolved in an aqueous 50% methanol solution. Protonated (H) thiuram ion and sodiated (Na) thiuram ion are detected at high sensitivity.

The control unit 30 in FIG. 28 monitors the ion intensity of ions of specified mass number (for example, protonated thiuram ion (mass/charge number.: 241) or sodiated thiuram ion (mass/charge number: 263)) or the entire ion intensity of the mass spectra, and controls the solution flow rate or the gas flow rate so that the monitored ion intensity is maximum.

FIG. 33 illustrates a schematic constitution of a device in which the present invention is applied to a mass spectrometer using an ionization means by an ion spray method.

A sample solution supplied to a sample solution injection unit 1 is introduced into a metallic capillary 35. The metallic capillary 35 is inserted into a tubular ion spray ion source 36. A DC voltage is applied by a power source 37 between the metallic capillary 35 and a sampling orifice part 10' of the mass spectrometer 11, and electrosprays a sampling solution from top end of the capillary 35. A gas supplied from a gas supply unit 4 is injected through a gas tube 5 at a flow rate within a range from 1 ml/min to 3 ml/min into the ion spray ion source 36, and flows along the outer circumferential surface of the capillary 35 to promote the evaporation effect of droplets formed by electrospraying. Also in the ion source by the ion spray method, the droplet density near the central axis of the nebulized flow is increased. Accordingly, if the flow rate of the sample solution is increased, a great amount of droplets are passed into the mass spectrometer like that in the sonic spray method described above and cooled and clustered by adiabatic expansion to bring about a problem of causing analysis noises. In view of the above, also in this embodiment, a gas flow containing droplets at high density near the central axis of the nebulized flow is diffused by using the diffuser 7 thereby keeping a value of the density of droplets in the gas flow passed into the mass spectrometer 11 appropriate, to thereby overcome the foregoing problem.

As has been described above specifically according to the present invention, since the nebulized flow from the ion source is diffused by using the diffuser and then passed into the mass spectrometer, it is possible to prevent that a great amount of droplets are passed into the mass spectrometer and the droplets are clustered by adiabatic expansion into large droplets to cause analytical noises, so that the S/N ratio is improved and the analysis accuracy is improved as compared with the mass spectrometer using the ion source by the sonic spray method of the prior art. Further, the device can be used effectively even when the flow rate of the sample solution is as high as about 1 ml/min.

Further, an optimum flow rate of the gas supplied can be set in accordance with the flow rate of the sample solution or the type of the solvent used thereby enabling ion detection at high efficiency. Further, it is also possible to adjust the flow rate of the sample solution in accordance with the kind of the solvent and the flow rate of the gas supplied. Furthermore, since the flow rate of the sample solution and/or the flow rate of the gas supplied can be auto-tuned so as to further increase the detected ion intensity, user's burden for the adjusting operation of the device can be moderated upon analysis to facilitate the handling of the device even to those not skilled in the art.

While several embodiments of the present invention have been explained, it will be apparent that the present invention is not limited only to such embodiments but various other modifications and applications are possible within a scope not departing the basic concept of the present invention.

What is claimed is:

1. A mass spectrometer comprising an ion source for nebulizing an introduced sample solution into atmospheric air by a gas flow at a high speed and ionizing sample ingredients dissolved in the sample solution and a mass spectrometer having an orifice for passing the ions formed by the ionization into vacuum, wherein a diffuser is disposed between the ion source and the orifice for diffusing a nebulized flow from the ion source, and said diffuser is a plate-like member having a plurality of holes arranged in the portion not-superposing with said orifice and substantially along the circumference of a circle.

2. A mass spectrometer according to claim 1, wherein the diameter D of said circle is within a range from 3 to 4 mm.

3. A mass spectrometer according to claim 1, wherein the apex of an isosceles triangle having the diameter D of said circle as a bottom and the distance H between said ion source and said diffuser as the height is within a range from 53 to 64 degrees.

4. A mass spectrometer comprising an ion source for nebulizing an introduced sample solution into atmospheric air by a gas flow at a high speed and ionizing sample ingredients dissolved in the sample solution and a mass spectrometer having an orifice for passing the ions formed by the ionization into a vacuum, wherein a diffuser is disposed between the ion source and the orifice for diffusing a nebulized flow from the ion source and a finite space is disposed between the diffuser and said orifice, said diffuser is a plate-like member having a plurality of holes arranged in the portion not-superposing with said orifice and substantially along the circumference of a circle, and the finite space is in communication by way of the plurality of holes with an atmospheric pressure space.

5. A mass spectrometer according to claim 4, wherein the diameter D of said circle is within a range from 3 to 4 mm.

6. A mass spectrometer according to claim 4, wherein the apex of an isosceles triangle having the diameter D of said circuit as a bottom and the distance H between said ion source and the diffuser as the height is within a range from 53 to 64 degrees.

7. A mass spectrometer comprising an ion source for nebulizing an introduced sample solution into atmospheric air by a gas flow at a high speed and ionizing sample ingredients dissolved in the sample solution and a mass spectrometer having an orifice for passing the ions formed by the ionization into vacuum, wherein a diffuser is disposed between the ion source and the orifice for diffusing a nebulized flow from the ion source and a small room is disposed between the diffuser and the orifice, and the diffuser is a plate-like member having a plurality of holes arranged in the portion not-superposing with said orifice and substantially along the circumference of a circle, and the small room is provided with an exhaust hole for discharging the gas in the small room into an atmospheric pressure space.

8. A mass spectrometer according to claim 7, wherein the diameter D of said circle is within a range from 3 to 4 mm.

9. A mass spectrometer according to claim 7, wherein the apex of an isosceles triangle having the diameter D of said circle as a bottom and the distance H between said ion source and said diffuser as the height is within a range from 53 to 64 degrees.

* * * * *